US011869445B2

(12) United States Patent
Yoon et al.

(10) Patent No.: US 11,869,445 B2
(45) Date of Patent: Jan. 9, 2024

(54) DISPLAY DEVICE AND METHOD OF DRIVING THE SAME

(71) Applicant: SAMSUNG DISPLAY CO., LTD., Yongin-si (KR)

(72) Inventors: Changnoh Yoon, Seoul (KR); Sangan Kwon, Cheonan-si (KR); Soon-Dong Kim, Osan-si (KR); Taehoon Kim, Hwaseong-si (KR); Eun Sil Yun, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/864,762

(22) Filed: Jul. 14, 2022

(65) Prior Publication Data

US 2023/0073348 A1 Mar. 9, 2023

(30) Foreign Application Priority Data

Sep. 7, 2021 (KR) ........................ 10-2021-0119310

(51) Int. Cl.
*G09G 3/3275* (2016.01)
*G09G 3/3266* (2016.01)

(52) U.S. Cl.
CPC ......... *G09G 3/3275* (2013.01); *G09G 3/3266* (2013.01); *G09G 2310/0278* (2013.01)

(58) Field of Classification Search
CPC ............... G09G 3/3275; G09G 3/3266; G09G 2310/0278; G09G 5/005; G09G 2310/0232; G09G 5/003; G09G 2340/0435
See application file for complete search history.

(56) References Cited

U.S. PATENT DOCUMENTS

| | | | | |
|---|---|---|---|---|
| 9,799,285 B2 | 10/2017 | Jang et al. | | |
| 10,573,236 B1 * | 2/2020 | Gao | G09G 3/2044 | |
| 11,043,191 B1 * | 6/2021 | Kang | G06F 1/1677 | |
| 2011/0032231 A1 * | 2/2011 | Maruyama | G09G 3/2096 | 345/208 |
| 2012/0050341 A1 * | 3/2012 | Wu | G02B 30/31 | 345/690 |

(Continued)

FOREIGN PATENT DOCUMENTS

| | | |
|---|---|---|
| KR | 20160064342 A | 6/2016 |
| KR | 20210014259 A | 2/2021 |

OTHER PUBLICATIONS

Korea Search Report for Korean Patent Application No. 10-2021-0119310, filed on Sep. 7, 2021, 17 pages.

*Primary Examiner* — Ibrahim A Khan
(74) *Attorney, Agent, or Firm* — CANTOR COLBURN LLP

(57) ABSTRACT

A display device includes a display panel, a data driver, a scan driver, and a driving controller. The display panel includes a first display area and a second display area, which operate at different frequencies from each other in a multi-frequency mode. The driving controller controls the data driver and the scan driver. The driving controller generates boundary compensation data by compensating for boundary image signals, which are input to correspond to a boundary area of the first display area in the multi-frequency mode and drives the data driver based on a compensation image signal including the boundary compensation data.

20 Claims, 21 Drawing Sheets

(56) References Cited

U.S. PATENT DOCUMENTS

| | | | | |
|---|---|---|---|---|
| 2014/0320479 | A1* | 10/2014 | Kaneko | G09G 3/3648 345/212 |
| 2015/0358018 | A1* | 12/2015 | Kim | G09G 3/20 345/208 |
| 2016/0111055 | A1* | 4/2016 | Na | G09G 3/3666 345/94 |
| 2016/0125785 | A1* | 5/2016 | Wang | G09G 5/391 345/582 |
| 2016/0155373 | A1* | 6/2016 | Jang | G09G 3/3648 345/691 |
| 2017/0116946 | A1* | 4/2017 | Nakatani | G09G 3/3677 |
| 2017/0372681 | A1* | 12/2017 | Imai | G06F 3/1462 |
| 2018/0182288 | A1* | 6/2018 | Kim | G09G 3/2059 |
| 2018/0247985 | A1* | 8/2018 | Jeon | H10K 59/353 |
| 2019/0033919 | A1* | 1/2019 | Hirakata | G06F 1/1652 |
| 2020/0005691 | A1* | 1/2020 | Yoo | G09G 3/20 |
| 2020/0082765 | A1* | 3/2020 | Zhang | G09G 3/3266 |
| 2020/0211475 | A1* | 7/2020 | Park | G09G 3/3275 |
| 2020/0226969 | A1* | 7/2020 | Jun | G09G 3/2007 |
| 2020/0294450 | A1* | 9/2020 | Kim | G09G 3/3233 |
| 2020/0394984 | A1* | 12/2020 | Park | G09G 3/3266 |
| 2022/0208089 | A1* | 6/2022 | Kim | G09G 3/20 |
| 2022/0208130 | A1* | 6/2022 | Park | H10K 59/131 |

* cited by examiner

FIG. 12B

R_AT

| | | | | | | |
|---|---|---|---|---|---|---|
| | GR1 | 0 | 0 | 0 | • • • | 0 |
| R_RV | GR2 | 0 | 4 | 8 | • • • | 1440 |
| | GR3 | 0 | 0 | 0 | • • • | 0 |
| | GR4 | 0 | 0 | 0 | • • • | 0 |
| | GR5 | 0 | 0 | 0 | • • • | 0 |

G_AT

| | | | | | | |
|---|---|---|---|---|---|---|
| | GR1 | 0 | 0 | 0 | • • • | 0 |
| | GR2 | 0 | 0 | 0 | • • • | 0 |
| | GR3 | 0 | 0 | 0 | • • • | 0 |
| G_RV | GR4 | 0 | 4 | 8 | • • • | 1440 |
| | GR5 | 0 | 0 | 0 | • • • | 0 |

B_AT

| | | | | | | |
|---|---|---|---|---|---|---|
| | GR1 | 0 | 0 | 0 | • • • | 0 |
| | GR2 | 0 | 0 | 0 | • • • | 0 |
| | GR3 | 0 | 0 | 0 | • • • | 0 |
| | GR4 | 0 | 0 | 0 | • • • | 0 |
| B_RV | GR5 | 0 | 4 | 8 | • • • | 1440 |

DISPLAY DEVICE AND METHOD OF DRIVING THE SAME

This application claims priority to Korean Patent Application No. 10-2021-0119310, filed on Sep. 7, 2021, and all the benefits accruing therefrom under 35 U.S.C. § 119, the content of which in its entirety is herein incorporated by reference.

BACKGROUND

1. Field

Embodiments of the disclosure described herein relate to a display device and a driving method thereof, and more particularly, relate to a display device capable of reducing power consumption and improving display quality, and a method of driving the display device.

2. Description of the Related Art

A light emitting display device among various types of display device displays an image by using a light emitting diode that generates a light through the recombination of electrons and holes. The light emitting display device is driven with a low power while providing a fast response speed.

The display device typically includes a display panel for displaying an image, a scan driver for sequentially supplying scan signals to scan lines included in the display panel, and a data driver for supplying data signals to data lines included in the display panel.

SUMMARY

Embodiments of the disclosure provide a display device capable of reducing power consumption and improving display quality.

Embodiments of the disclosure provide a method of drive the display device.

According to an embodiment, a display device includes a display panel, a data driver, a scan driver, and a driving controller.

In such an embodiment, the display panel includes a plurality of pixels, which are connected to a plurality of data lines and a plurality of scan lines, where a first display area and a second display area, which operate at different frequencies from each other in a multi-frequency mode, are defined in the display panel. In such an embodiment, the data driver drives the plurality of data lines, the scan driver drives the plurality of scan lines, and the driving controller controls the data driver and the scan driver.

In such an embodiment, the driving controller generates boundary compensation data by compensating for boundary image signals, which are input to correspond to a boundary area of the first display area in the multi-frequency mode, where the boundary area is a portion of the first display area adjacent to the second display area, and the driving controller drives the data driver based on a compensation image signal including the boundary compensation data.

According to an embodiment, a method of driving a display device including a first display area and a second display area, which operate at different frequencies from each other in a multi-frequency mode, includes receiving a boundary image signal corresponding to a boundary area of the first display area, where the boundary area is a portion of the first display area adjacent to the second display area, generating boundary compensation data by compensating for the boundary image signal, and driving the first display area and the second display area based on a compensation image signal including the boundary compensation data.

BRIEF DESCRIPTION OF THE DRAWINGS

The above and other features of the disclosure will become apparent by describing in detail embodiments thereof with reference to the accompanying drawings.

FIG. 12B is a block diagram illustrating a configuration of an accumulation table shown in FIG. 12A.

DETAILED DESCRIPTION

Figure 1:
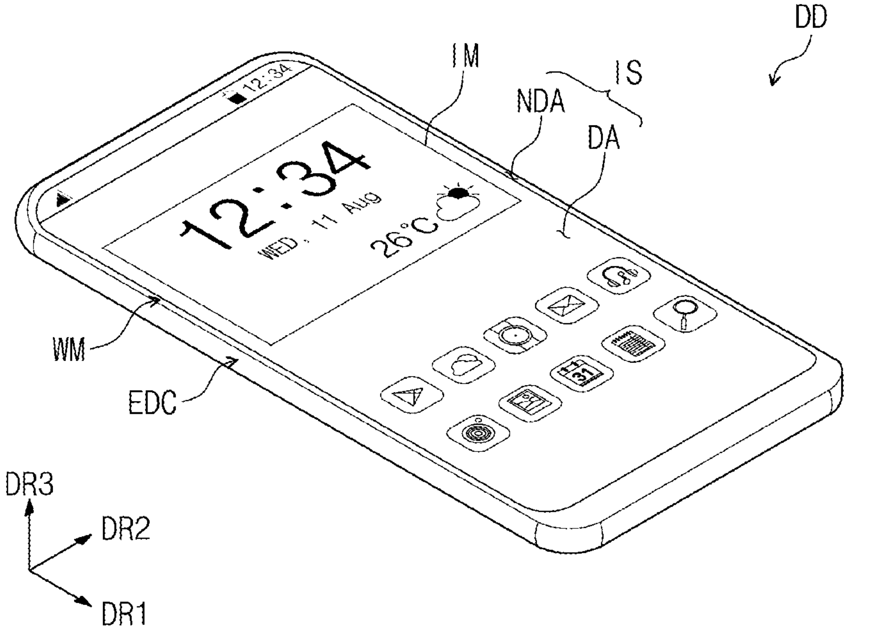
FIG. 1 is a perspective view of a display device, according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the specification, the expression that a first component (or region, layer, part, portion, etc.) is "on", "connected with", or "coupled with" a second component means that the first component is directly on, connected with, or coupled with the second component or means that a third component is interposed therebetween.

Like reference numerals refer to like elements throughout. Also, in drawings, the thickness, ratio, and dimension of components are exaggerated for effectiveness of description of technical contents. The expression "and/or" includes one or more combinations which associated components are capable of defining.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical terms and scientific terms) used in the specification have the same meaning as commonly understood by one skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described in detail with reference to the accompanying drawings.

FIG. 1 is a cross-sectional view of a display device, according to an embodiment of the disclosure.

Referring to FIG. 1, an embodiment of a display device DD may be a device activated depending on an electrical signal. The display device DD may be applied to an electronic device such as a smartphone, a smart watch, a tablet personal computer ("PC"), a notebook/laptop computer, a PC, a smart television, or the like.

The display device DD may display an image IM on a display surface IS parallel to each of a first direction DR1 and a second direction DR2, to face a third direction DR3. The display surface IS on which the image IM is displayed may correspond to a front surface of the display device DD. The image IM may include a still image as well as a moving image.

In an embodiment, a front surface (or an upper/top surface) and a rear surface (or a lower/bottom surface) of each member are defined based on a direction in which the image IM is displayed. The front surface and the rear surface may be opposite to each other in the third direction DR3, and a normal direction of each of the front surface and the rear surface may be parallel to the third direction DR3.

The separation distance between the front surface and the rear surface in the third direction DR3 may correspond to a thickness of the display device DD in the third direction DR3. Here, directions that the first, second, and third directions DR1, DR2, and DR3 indicate may be relative in concept and may be changed to different directions.

The display surface IS of the display device DD may be divided into a display area DA and a non-display area NDA. The display area DA may be an area in which the image IM is displayed. The user perceives (or views) the image IM through the display area DA. In an embodiment, as shown in FIG. 1, the display area DA may be in the shape of a quadrangle whose vertexes are rounded. However, this is only an example. The display area DA may have various shapes, not limited to any one embodiment.

The non-display area NDA is adjacent to the display area DA. The non-display area NDA may have a given color. The non-display area NDA may surround the display area DA. As such, a shape of the display area DA may be defined substantially by the non-display area NDA. However, this is only an example. Alternatively, the non-display area NDA may be disposed adjacent to only one side of the display area DA or may be omitted. The display device DD may be implemented with various embodiments, and is not limited to an embodiment.

An embodiment of the display device DD may include a display panel DP (see FIG. 4) and a window WM disposed on the display panel DP.

In an embodiment, the display panel DP may be a light emitting display panel, and is not particularly limited thereto. In an embodiment, for example, the display panel DP may be an organic light emitting display panel, an inorganic light emitting display panel, or a quantum dot light emitting display panel. A light emitting layer of the organic light emitting display panel may include an organic light emitting material. A light emitting layer of the inorganic light emitting display panel may include an inorganic light emitting material. A light emitting layer of the quantum dot light emitting display panel may include a quantum dot, a quantum rod, or the like. The display panel DP will be described in detail later with reference to FIG. 4.

The window WM may include or be formed of a transparent material capable of outputting an image. In an embodiment, for example, the window WM may include or be formed of glass, sapphire, plastic, or the like. In an embodiment, the window WM may be implemented with a single layer or have a single layer structure. However, an embodiment is not limited thereto. In an alternative embodiment, for example, the window WM may include a plurality of layers or have a multilayer structure. In an embodiment, although not illustrated, the non-display area NDA of the display device DD described above may correspond to an area that is defined by printing a material including a given color on one area of the window WM.

A plurality of functional layers (e.g., an anti-reflection layer or an input sensor layer) may be further interposed between the window WM and the display panel DP. The anti-reflection layer decreases reflectivity of an external light incident from above the window WM. The anti-reflection layer according to an embodiment of the disclosure may include a retarder and a polarizer. The retarder may be a retarder of a film type or a liquid crystal coating type and may include a $\lambda/2$ retarder and/or $\lambda/4$ retarder. The polarizer may also have a film type or a liquid crystal coating type. The film type may include a stretch-type synthetic resin film, and the liquid crystal coating type may include liquid crystals arranged in a given direction. The retarder and the polarizer may be implemented with one polarization film.

The input sensor layer may sense an external input. The external input may include various types of inputs provided from the outside of the display device DD. In an embodiment, for example, as well as a contact by a part of a body such as a user's hand, the external input may include an external input (e.g., hovering) applied when the user's hand approaches the display device DD or is adjacent to the display device DD within a predetermined distance. In an embodiment, the external input may have various types such as force, pressure, temperature, light, and the like. The input sensor layer may be directly disposed or provided on the display panel DP through a sequential process, or may be manufactured through a separate process and then may be coupled to the display panel DP through an adhesive.

The display device DD further includes an outer case EDC for accommodating the display panel DP. The outer case EDC may be coupled to the window WM to define the exterior appearance of the display device DD. The outer case EDC may absorb external shocks and may prevent a foreign material/moisture or the like from being infiltrated into the display module DM such that components accommodated in the outer case EDC are protected. In an embodiment, for example, the outer case EDC may be implemented by coupling a plurality of accommodating members.

In an embodiment, the display device DD may further include an electronic module including various functional modules for operating the display module DM, a power supply module for supplying a power necessary for overall operations of the display device DD, a bracket coupled with the display module DM and/or the outer case EDC to partition an inner space of the display device DD, or the like.

Figure 2A:
FIG. 2A is a plan view illustrating a screen of a display device operating in a normal frequency mode, according to an embodiment of the disclosure.
Figure 2B:
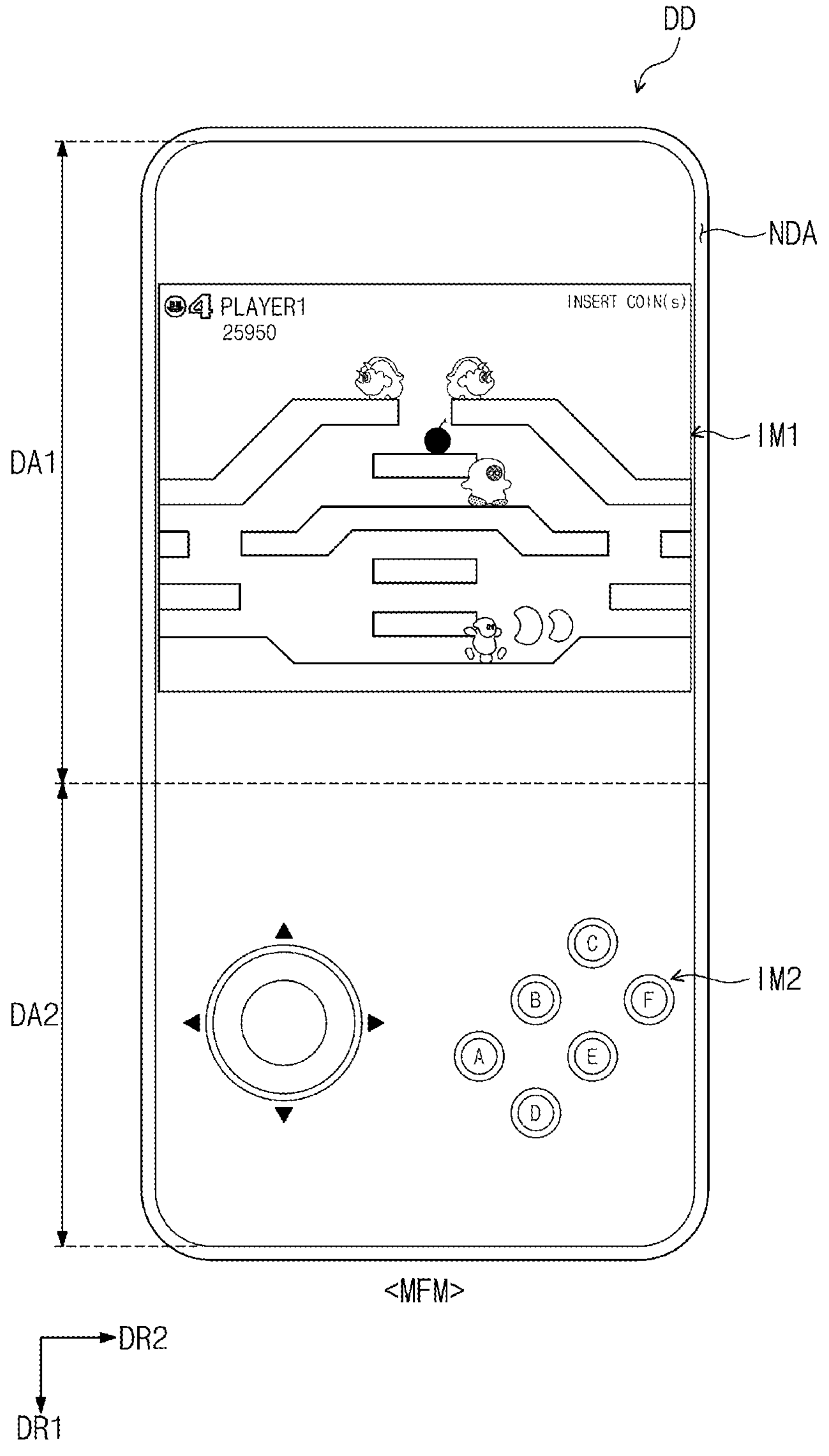
FIG. 2B is a plan view illustrating a screen of a display device operating in a multi-frequency mode, according to an embodiment of the disclosure.
Figure 3A:
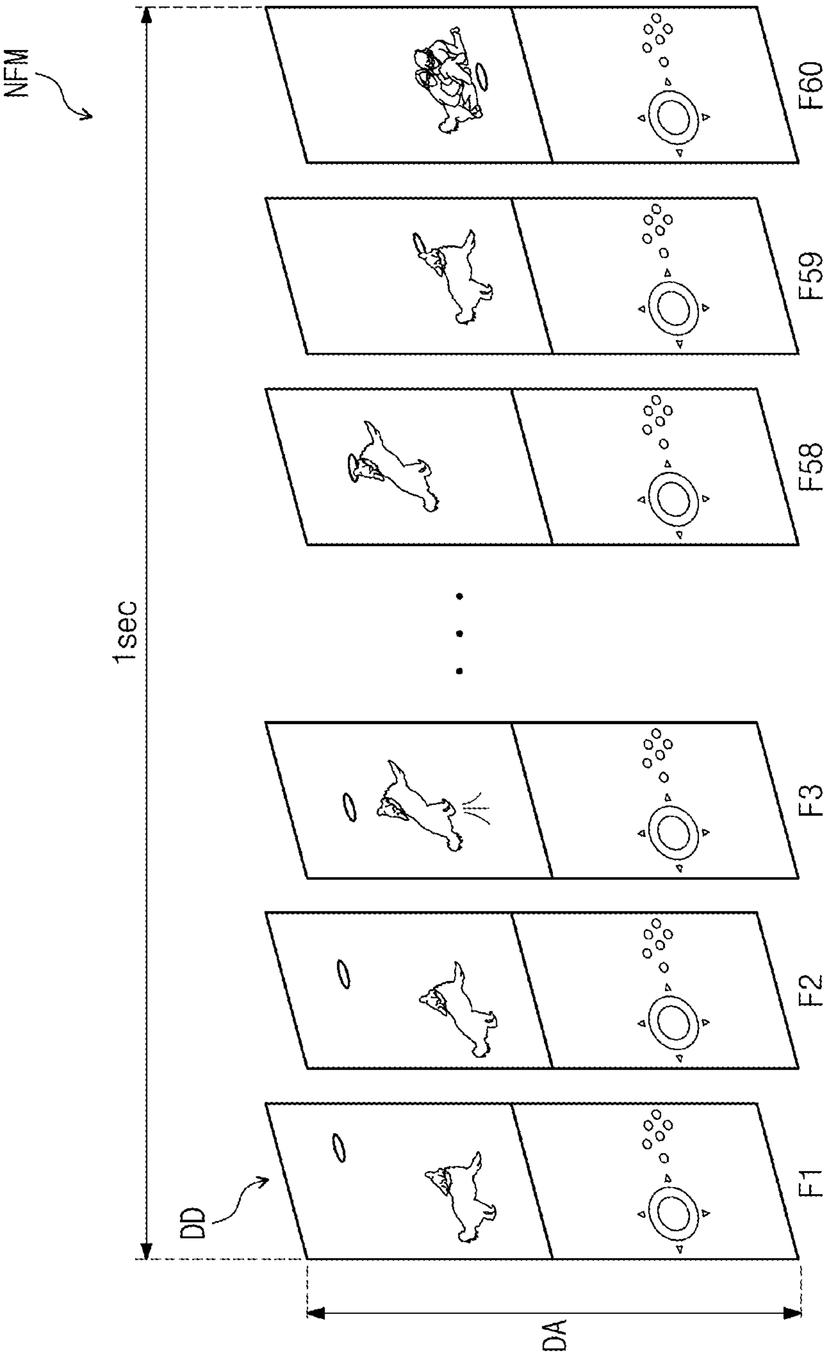
FIG. 3A is a diagram for describing an operation of a display device in a normal frequency mode, according to an embodiment of the disclosure.
Figure 3B:
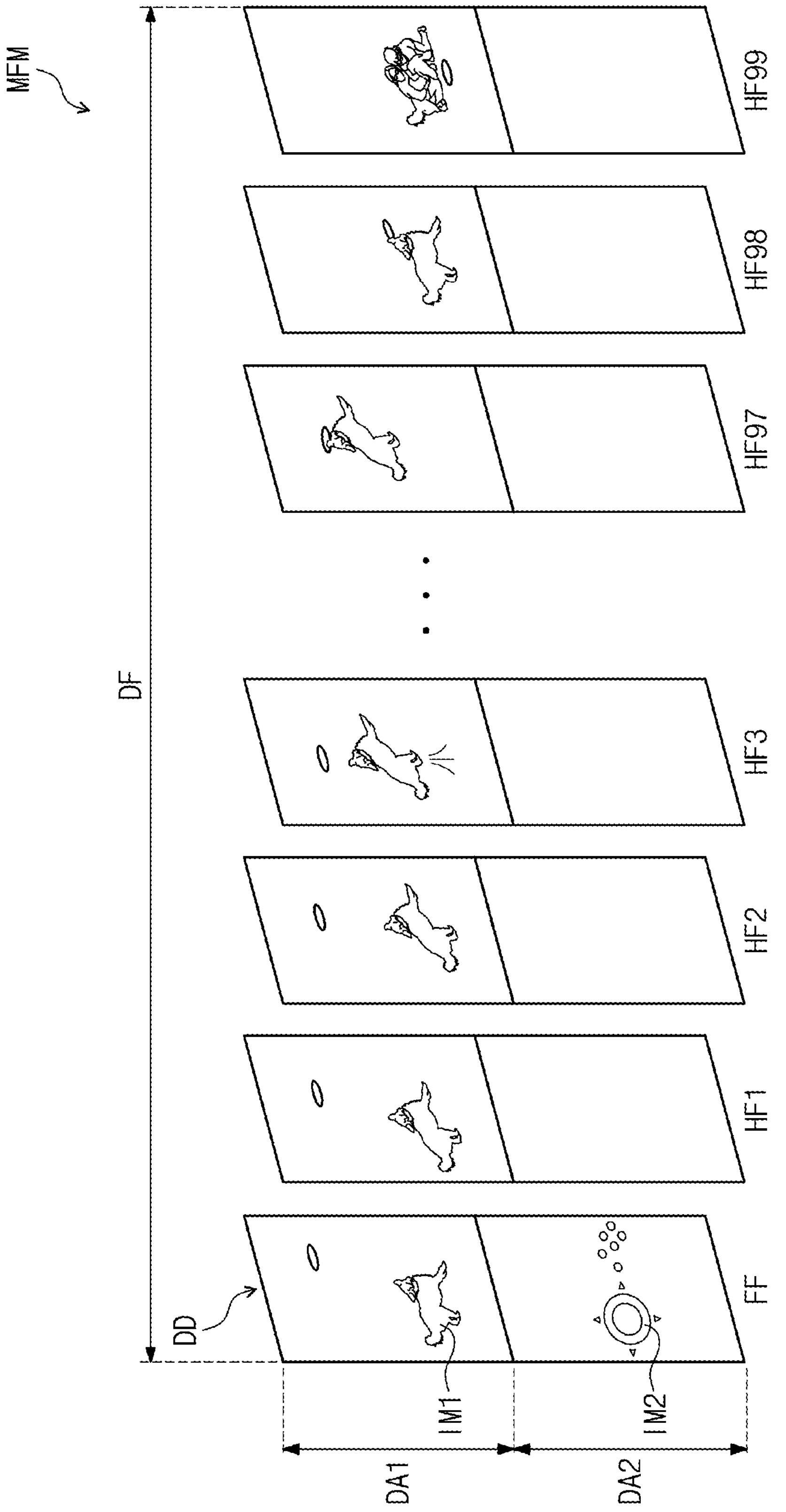
FIG. 3B is a view for describing an operation of a display device in a multi-frequency mode, according to an embodiment of the disclosure.

FIG. 2A is a plan view illustrating a screen of a display device operating in a normal frequency mode. FIG. 2B is a plan view illustrating a screen of a display device operating in a multi-frequency mode. FIG. 3A is a view for describing an operation of a display device in a normal frequency mode. FIG. 3B is a view for describing an operation of a display device in a multi-frequency mode.

Referring to FIGS. 2A to 3B, an embodiment of the display device DD may display an image in a normal frequency mode NFM or a multi-frequency mode MFM. In the normal frequency mode NFM, the display area DA of the display device DD is not divided into a plurality of display areas in which operating frequencies are different from each other. That is, in the normal frequency mode NFM, the display area DA may operate at one operating frequency; the operating frequency of the display area DA in the normal frequency mode NFM may be defined as a normal frequency. In an embodiment, for example, the normal frequency may be about 60 hertz (Hz). In the normal frequency mode NFM, 60 images corresponding to the first to 60th frames F1 to F60 may be displayed in the display area DA of the display device DD for 1 second (1 sec).

In the multi-frequency mode MFM, the display area DA of the display device DD is divided into a plurality of display areas in which operating frequencies are different from each other. In an embodiment, for example, in the multi-frequency mode MFM, the display area DA may include a first display area DA1 and a second display area DA2. The first and second display areas DA1 and DA2 are disposed adjacent to each other in the first direction DR1. The first display area DA1 may operate at a first operating frequency equal to or higher than the normal frequency. The second display area DA2 may operate at a second operating frequency lower than the normal frequency. In an embodiment, for example, where the normal frequency is 60 Hz, the first operating frequency may be 60 Hz, 80 Hz, 90 Hz, 100 Hz, 120 Hz, etc., and the second operating frequency may be 1 Hz, 20 Hz, 30 Hz, 40 Hz, etc.

According to an embodiment of the disclosure, the first display area DA1 may be an area in which a dynamic image (hereinafter referred to as a "first image IM1") with high-speed driving is displayed; the second display area DA2 may be an area in which a still image (hereinafter referred to as a "second image IM2") without high-speed driving or a text image having a long change period is displayed. Accordingly, when the still image and the video are simultaneously displayed in the screen of the display device DD, it is possible to improve the display quality of the dynamic image and to reduce power consumption while the display device DD operates in the multi-frequency mode MFM.

Referring to FIGS. 3A and 3B, in the multi-frequency mode MFM, an image may be displayed in the display area DA of the display device DD during a plurality of driving frames DF. Each of the driving frames DF may include a full frame FF in which both the first display area DAT and the second display area DA2 are driven, and partial frames HF1 to HF99 in each of which only the first display area DAT is driven. Each of the partial frames HF1 to HF99 may have duration shorter than the full frame FF. The numbers of partial frames HF1 to HF99 included in each driving frame DF may be equal or different. Each driving frame DF may be defined as a period from a time, at which a current full frame is initiated, to a time at which a next full frame FF is initiated.

In an embodiment, for example, during each driving frame DF, the first display area DA1 may operate at 100 Hz, and the second display area DA2 may operate at 1 Hz. In such an embodiment, each driving frame DF may have duration corresponding to 1 second (1 sec) and may include one full frame FF and 99 partial frames HF1 to HF99. In each driving frame DF, the 100 first images IM1 including the full frame FF and the 99 partial frames HF1 to HF99, that is, 100 images IM1 may be displayed in the first display area DA1 of the display device DD, and one second image IM2 corresponding to the full frame FF may be displayed in the second display area DA2.

For convenience of description, FIG. 3B illustrates an embodiment where, in the multi-frequency mode MFM, the first operating frequency is 100 Hz and the second operating frequency is 1 Hz, but the disclosure is not limited thereto. In an alternative embodiment, for example, the first operating frequency may be 100 Hz, and the second operating frequency may be 20 Hz. In such an embodiment, in each driving frame DF, the first images IM1 including one full frame FF and 4 partial frames, that is, 5 images IM1 may be displayed in the first display area DAT of the display device DD, and one second image IM2 corresponding to the full frame FF may be displayed in the second display area DA2. In an embodiment, the first operating frequency may be 100 Hz, and the second operating frequency may be 30 Hz. In such an embodiment, in each driving frame DF, the first images IM1 including one full frame FF and 2 partial frames, that is, 3 images IM1 may be displayed in the first display area DA1 of the display device DD, and one second image IM2 corresponding to the full frame FF may be displayed in the second display area DA2.

Figure 4:
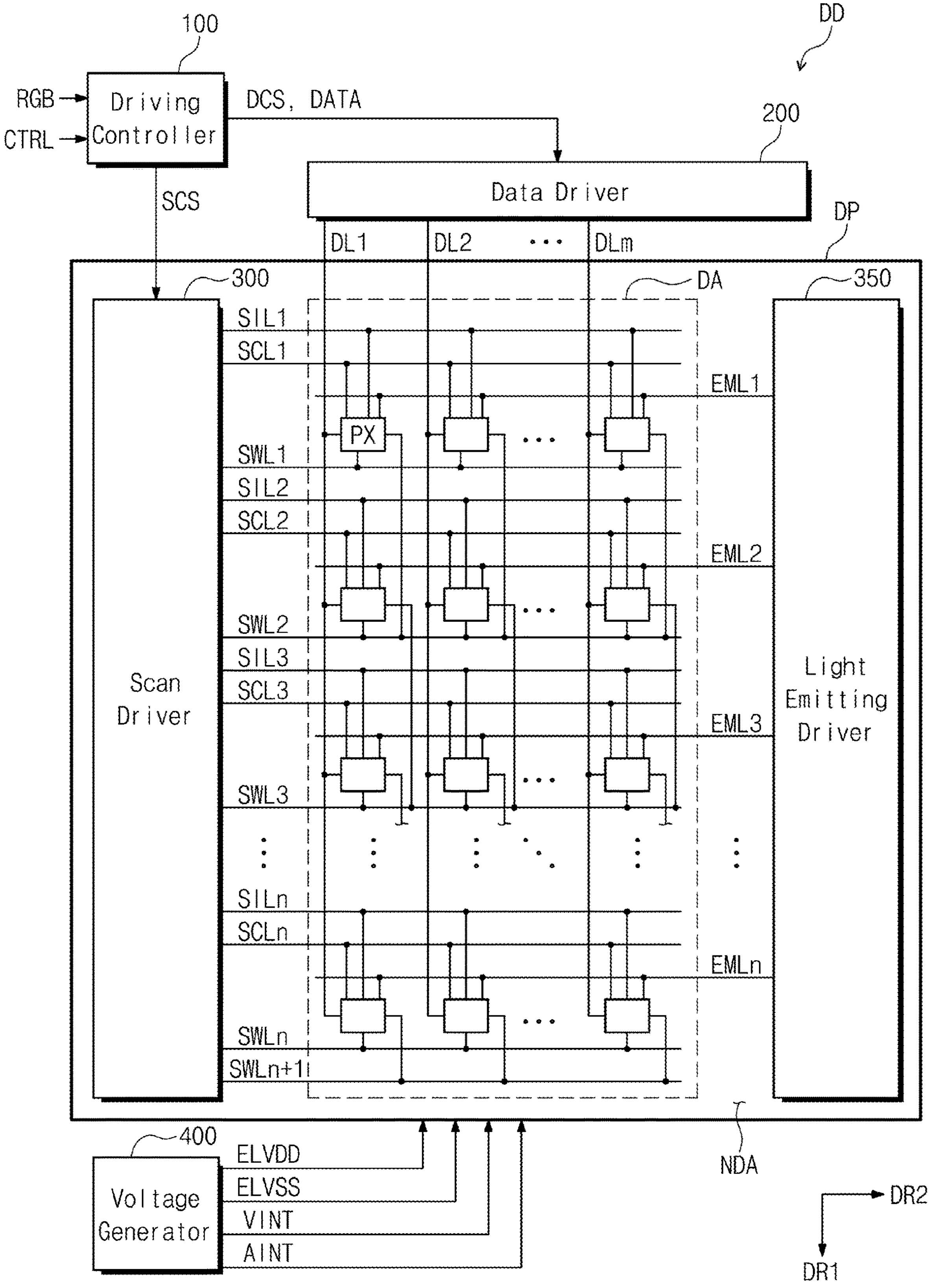
FIG. 4 is a block diagram of a display device, according to an embodiment of the disclosure.
Figure 5:
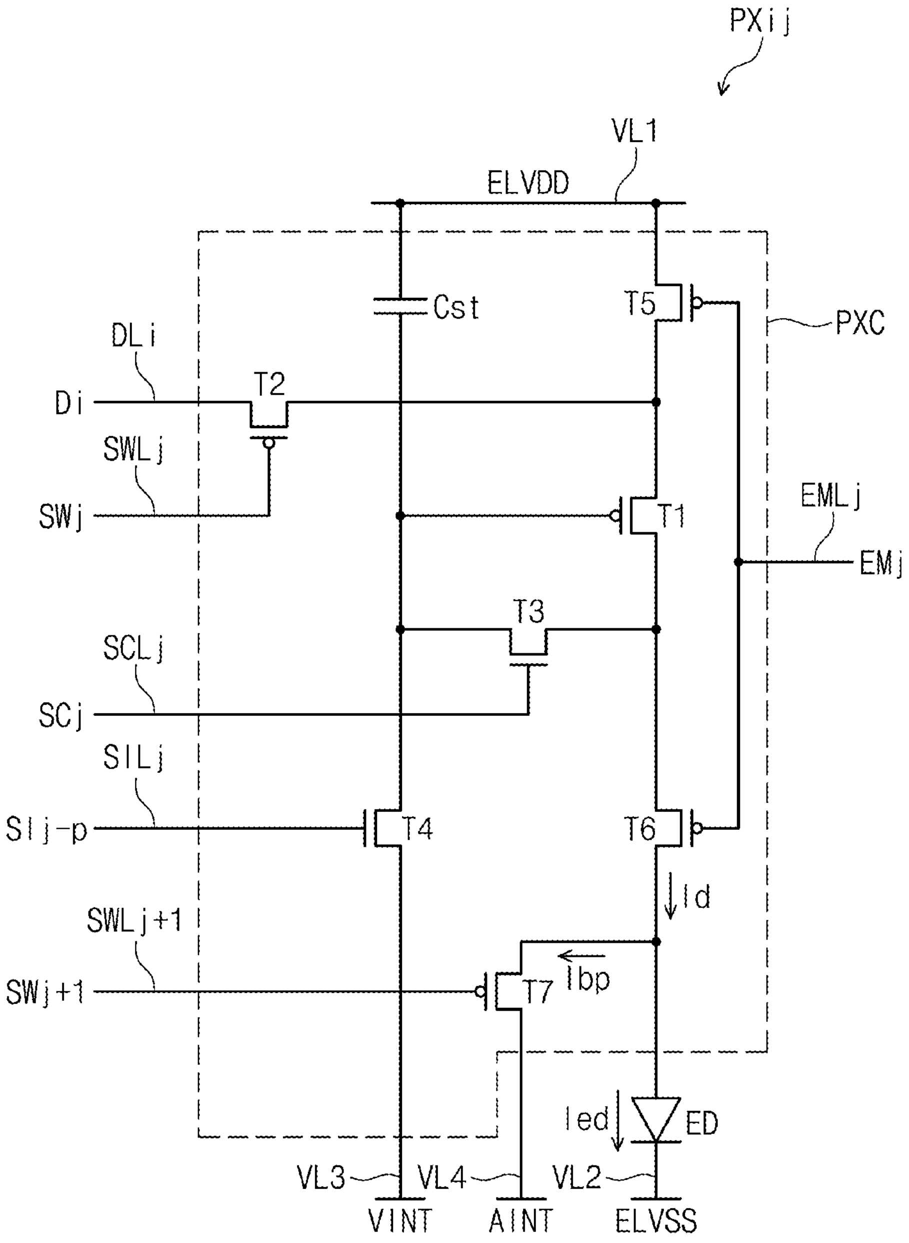
FIG. 5 is a circuit diagram of a pixel, according to an embodiment of the disclosure.
Figure 6:
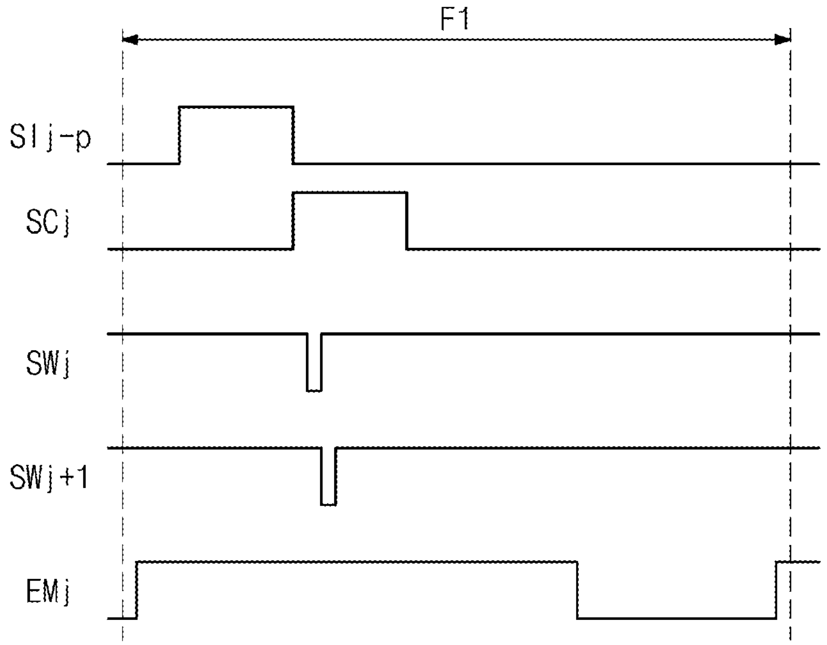
FIG. 6 is a signal timing diagram for describing an operation of a pixel illustrated in FIG. 5.

FIG. 4 is a block diagram of a display device, according to an embodiment of the disclosure. FIG. 5 is a circuit diagram of a pixel, according to an embodiment of the disclosure. FIG. 6 is a timing diagram for describing an operation of a pixel illustrated in FIG. 5.

Referring to FIGS. 4 and 5, an embodiment of the display device DD includes the display panel DP, a panel driver for driving the display panel DP, and a driving controller 100 for controlling an operation of the panel driver. According to an embodiment of the disclosure, the panel driver includes a data driver 200, a scan driver 300, a light emitting driver 350, and a voltage generator 400.

The driving controller 100 receives an input image signal RGB and a control signal CTRL. The driver controller 100 generates an image data signal DATA by converting a data format of the input image signal RGB in compliance with the specification for an interface with the data driver 200. In the multi-frequency mode MFM, the driving controller 100 may generate a compensation image signal RGB' (see FIG. 10) for compensating for the input image signal RGB and then may convert the compensation image signal RGB' into the image data signal DATA. The driving controller 100 generates a scan control signal SCS and a data control signal DCS based on a control signal CTRL.

The data driver 200 receives the data control signal DCS and the image data signal DATA from the driver controller 100. The data driver 200 converts the image data signal DATA into data signals and outputs the data signals to a plurality of data lines DL1 to DLm to be described later. The data signals may be analog voltages corresponding to a grayscale value of the image data signal DATA.

The scan driver 300 receives the scan control signal SCS from the driving controller 100. The scan driver 300 may output scan signals to scan lines in response to the scan control signal SCS.

The voltage generator 400 generates voltages used to operate the display panel DP. In an embodiment, the voltage generator 400 generates a first driving voltage ELVDD, a second driving voltage ELVSS, a first initialization voltage VINT, and a second initialization voltage AINT.

The display panel DP includes initialization scan lines SIL1 to SILn, compensation scan lines SCL1 to SCLn, write scan lines SWL1 to SWLn+1, emission control lines EML1 to EMLn, data lines DL1 to DLm, and pixels PX. The initialization scan lines SIL1 to SILn, the compensation scan lines SCL1 to SCLn, the write scan lines SWL1 to SWLn+1, the emission control lines EML1 to EMLn, the data lines DL1 to DLm, and the pixels PX may overlap or be disposed in the display area DA. The initialization scan lines SIL1 to SILn, the compensation scan lines SCL1 to SCLn, the write scan lines SWL1 to SWLn+1, and the emission control lines EML1 to EMLn extend in the second direction DR2. The initialization scan lines SIL1 to SILn, the compensation scan lines SCL1 to SCLn, the write scan lines SWL1 to SWLn+1, and the emission control lines EML1 to EMLn are arranged spaced from one another in the first direction DR1. The data lines DL1 to DLm extend in the first direction DR1 and are arranged spaced from one another in the second direction DR2.

The plurality of pixels PX are electrically connected to the initialization scan lines SIL1 to SILn, the compensation scan lines SCL1 to SCLn, the write scan lines SWL1 to SWLn+1, the emission control lines EML1 to EMLn, and the data lines DL1 to DLm, respectively. Each of the plurality of pixels PX may be electrically connected with four scan lines. In an embodiment, for example, as illustrated in FIG. 4, the first row of pixels may be connected to the first initialization scan line SILL, the first compensation scan line SCL1, and the first and second write scan lines SWL1 and SWL2. In such an embodiment, the second row of pixels may be connected to the second initialization scan line SIL2, the second compensation scan line SCL2, and the second and third write scan lines SWL2 and SWL3.

The scan driver 300 may be disposed in the non-display area NDA of the display panel DP. The scan driver 300 receives the scan control signal SCS from the driving controller 100. In response to the scan control signal SCS, the scan driver 300 may output initialization scan signals to the initialization scan lines SIL1 to SILn, may output compensation scan signals to the compensation scan lines SCL1 to SCLn, and may output write scan signals to the write scan lines SWL1 to SWLn+1. The circuit configuration and operation of the scan driver 300 will be described in detail later.

The light emitting driver 350 may output emission control signals to the emission control lines EML1 to EMLn. Alternatively, the scan driver 300 may be connected to the emission control lines EML1 to EMLn. In such an embodiment, the scan driver 300 may output the emission control signals to the emission control lines EML1 to EMLn.

Each of the plurality of pixels PX includes a light emitting diode ED and a pixel circuit unit PXC for controlling light emission of the light emitting diode ED. The pixel circuit unit PXC may include a plurality of transistors and a capacitor. The scan driver 300 and the light emitting driver 350 may include transistors formed through the same process as the pixel circuit unit PXC.

Each of the plurality of pixels PX receives the first driving voltage ELVDD, the second driving voltage ELVSS, the first initialization voltage VINT, and the second initialization voltage AINT from the voltage generator 400.

FIG. 5 illustrates an equivalent circuit diagram of one pixel PXij among the plurality of pixels PX illustrated in FIG. 4. Hereinafter, a circuit structure of the pixel PXij will be described. The plurality of pixels PX have a same structure as each other, and thus, any repetitive detailed description of other pixels will be omitted. The pixel PXij shown in FIG. 5 is a pixel connected to the i-th data line DLi (hereinafter referred to as a "data line") among the data lines DL1 to DLm, the j-th initialization scan line SILj (hereinafter referred to as an "initialization scan line") among the initialization scan lines SIL1 to SILn, the j-th compensation scan line SCLj (hereinafter referred to as a "compensation scan line") among the compensation scan lines SCL1 to SCLn, the j-th and (j+1)-th write scan lines SWLj and SWLj+1 (hereinafter referred to as "first and second write scan lines") among the write scan lines SWL1 to SWLn+1, and the j-th emission control line EMLj (hereinafter referred to as an "emission control line") among the emission control lines EML1 to EMLn.

The pixel PXij includes the light emitting diode ED and the pixel circuit unit PXC. The pixel circuit unit PXC includes first to seventh transistors T1, T2, T3, T4, T5, T6, and T7 and a single capacitor Cst. Each of the first to seventh transistors T1 to T7 may be a transistor having a low-temperature polycrystalline silicon ("LTPS") semiconductor layer. Some of the first to seventh transistors T1 to T7 may be P-type transistors, and the remaining of the first to seventh transistors T1 to T7 may be N-type transistors. In an embodiment, for example, among the first to seventh transistors T1 to T7, the first, second, and fifth to seventh transistors T1, T2, and T5 to T7 are P-type transistors, and the third and fourth transistors T3 and T4 may be N-type transistors. In such an embodiment, each of the third and fourth transistors T3 and T4 may be an oxide semiconductor transistor. However, a configuration of the pixel circuit unit PXC is not limited to the embodiment illustrated in FIG. 5. The pixel circuit unit PXC illustrated in FIG. 5 is only one embodiment, and the configuration of the pixel circuit unit PXC may be variously modified. In an embodiment, for example, all of the first to seventh transistors T1 to T7 may be P-type transistors or N-type transistors.

The initialization scan line SILj may transmit the (j−p)-th initialization scan signal SIj−p (hereinafter referred to as an "initialization scan signal") to the pixel PXij. The compensation scan line SCLj may transmit the j-th compensation scan signal SCj (hereinafter referred to as a "compensation scan signal") to the pixel PXij. The first and second write scan lines SWLj and SWLj+1 may transmit the j-th and (j+1)-th write scan signals SWj and SWj+1 (hereinafter referred to as "first and second write scan signals") to the pixel PXij. Also, the emission control line EMLj may transmit the j-th light emitting control signal EMj (hereinafter referred to as a "light emitting control signal") to the pixel PXij. The data line DLi transmits a data signal Di to the pixel PXij. The data signal Di may have a voltage level corresponding to the grayscale of the corresponding image signal among the image signal RGB supplied to the display device DD (see FIG. 4). First to fourth driving voltage lines VL1, VL2, VL3, and VL4 may transmit the first driving voltage ELVDD, the second driving voltage ELVSS, the first initialization voltage VINT, and the second initialization voltage AINT to the pixel PXij, respectively.

The first transistor T1 includes a first electrode connected to the first driving voltage line VL1 via the fifth transistor T5, a second electrode electrically connected to the anode of the light emitting diode ED via the sixth transistor T6, and a gate electrode connected to one end of the capacitor Cst. The first transistor T1 may receive the data signal Di, which is transmitted by the data line DLi, based on the switching operation of the second transistor T2 and then may supply a driving current Id to the light emitting diode ED.

The second transistor T2 includes a first electrode connected to the data line DLi, a second electrode connected to the first electrode of the first transistor T1, and a gate electrode connected to the first write scan line SWLj. The second transistor T2 may be turned on in response to the first write scan signal SWj received through the first write scan line SWLj and then may transmit the data signal Di received from the data line DLi to the first electrode of the first transistor T1.

The third transistor T3 includes a first electrode connected to the second electrode of the first transistor T1, a second electrode connected to the gate electrode of the first transistor T1, and a gate electrode connected to the compensation scan line SCLj. The third transistor T3 may be turned on in response to the compensation scan signal SCj received through the compensation scan line SCLj, and thus, the gate electrode and the second electrode of the first transistor T1 may be connected to each other, that is, the first transistor T1 may be diode-connected.

The fourth transistor T4 includes a first electrode connected to the gate electrode of the first transistor T1, a second electrode connected to the third voltage line VL3 through which the first initialization voltage VINT is transmitted, and a gate electrode connected to the initialization scan line SILj. The fourth transistor T4 may be turned on in response to the initialization scan signal SIj−p received through the initialization scan line SILj and may perform an initialization operation to initialize the voltage of the gate electrode of the first transistor T1 by providing the first initialization voltage VINT to the gate electrode of the first transistor T1.

The fifth transistor T5 includes a first electrode connected to the first driving voltage line VL1, a second electrode connected to the first electrode of the first transistor T1, and a gate electrode connected to the emission control line EMLj.

The sixth transistor T6 includes a first electrode connected to the second electrode of the first transistor T1, a second electrode connected to the anode of the light emitting diode ED, and a gate electrode connected to the emission control line EMLj.

The fifth transistor T5 and sixth transistor T6 are simultaneously turned on in response to the emission control signal EMj received through the emission control line EMLj. The first driving voltage ELVDD applied through the turned-on fifth transistor T5 may be compensated through the diode-connected first transistor T1 and then may be transmitted to the light emitting diode ED.

The seventh transistor T7 includes a first electrode connected to the second electrode of the sixth transistor T6, a second electrode connected to the fourth driving voltage line VL4, through which the second initialization voltage AINT is transmitted, and a gate electrode connected to the second write scan line SWLj+1.

As described above, one end of the capacitor Cst is connected to the gate electrode of the first transistor T1, and the other end of the capacitor Cst is connected to the first driving voltage line VL1. The cathode of the light emitting diode ED may be connected to the second driving voltage line VL2 that transmits the second driving voltage ELVSS.

Referring to FIGS. 5 and 6, when the initialization scan signal SIj−p having a high level is provided through the initialization scan line SILj during an initialization period of one frame F1, the fourth transistor T4 is turned on in response to the initialization scan signal SIj−p having the high level. The first initialization voltage VINT is applied to the gate electrode of the first transistor T1 through the turned-on fourth transistor T4, and the gate electrode of the first transistor T1 is initialized by the first initialization voltage VINT.

Next, when the compensation scan signal SCj having a high level is supplied through the compensation scan line SCLj during a compensation period of one frame F1, the third transistor T3 is turned on. The compensation period may not overlap the initialization period. An activation period of the compensation scan signal SCj is defined as a period in which the compensation scan signal SCj has a high level. The activation period of the initialization scan signal SIj−p is defined as a period in which the initialization scan signal SIj−p has a high level. The activation period of the compensation scan signal SCj may not overlap the activation period of the initialization scan signal SIj−p. The activation period of the initialization scan signal SIj−p may precede the activation period of the compensation scan signal SCj.

During the compensation period, the first transistor T1 is diode-connected by the third transistor T3 turned on and is forward-biased. The compensation period may include a data write period in which the first write scan signal SWj is generated to have a low level. During the data write period, the second transistor T2 is turned on by the first write scan signal SWj having the low level. Then, a compensation voltage (Di-Vth) obtained by subtracting the threshold voltage (Vth) of the first transistor T1 is applied to the gate electrode of the first transistor T1 from the voltage of the data signal Di supplied from the data line DLi. That is, the potential of the gate electrode of the first transistor T1 may be the compensation voltage (Di-Vth).

The first driving voltage ELVDD and the compensation voltage (Di-Vth) may be applied to both ends of the capacitor Cst, and the charge corresponding to the voltage difference between both ends may be stored in the capacitor Cst.

During the compensation period, the seventh transistor T7 is turned on by receiving the second write scan signal SWj+1 having the low level through the second write scan line SWLj+1. A portion of the driving current Id may be drained through the seventh transistor T7 as a bypass current Ibp.

In a case where the pixel PXij displays a black image, when the light emitting diode ED emits light even though the minimum driving current of the first transistor T1 flows as the driving current Id, the pixel PXij may not normally display the black image. Accordingly, the seventh transistor T7 of the pixel PXij according to an embodiment of the disclosure may drain (or disperse) a part of the minimum driving current of the first transistor T1 to a current path, which is different from a current path to the light emitting element ED, as the bypass current Ibp. Herein, the minimum driving current of the first transistor T1 means the current flowing into the first transistor T1 under the condition that the first transistor T1 is turned off because the gate-source voltage (Vgs) of the first transistor T1 is less than the threshold voltage (Vth). As the minimum driving current (e.g., a current of 10 picoampere (pA) or less) flowing into the first transistor T1 is transferred to the light emitting diode ED under a condition that the first transistor T1 is turned off, an image having a black grayscale is displayed. When the pixel PXij displays the black image, the bypass current Ibp has a relatively large influence on the minimum driving current. On the other hand, when the pixel PXij displays an image such as a normal image or a white image, the bypass current Ibp has little effect on the driving current Id. Accordingly, when the pixel PXij displays the black image, a current (i.e., the light emitting current led), which is obtained by reducing the driving current Id by the amount of the bypass current Ibp flowing through the seventh transistor T7 is provided to the light emitting diode ED, and thus the black image may be clearly displayed. Accordingly, the pixel PXij may implement an accurate black grayscale image by using the seventh transistor T7, and thus a contrast ratio may be improved.

Next, the emission control signal EMj supplied from the emission control line EMLj is changed from a high level to a low level. The fifth transistor T5 and the sixth transistor T6 are turned on by the emission control signal EMj having a low level. In this case, the driving current Id is generated based on a voltage difference between the gate voltage of the gate electrode of the first transistor T1 and the first driving voltage ELVDD and is supplied to the light emitting diode ED through the sixth transistor T6, and the current led flows through the light emitting diode ED.

Figure 7:
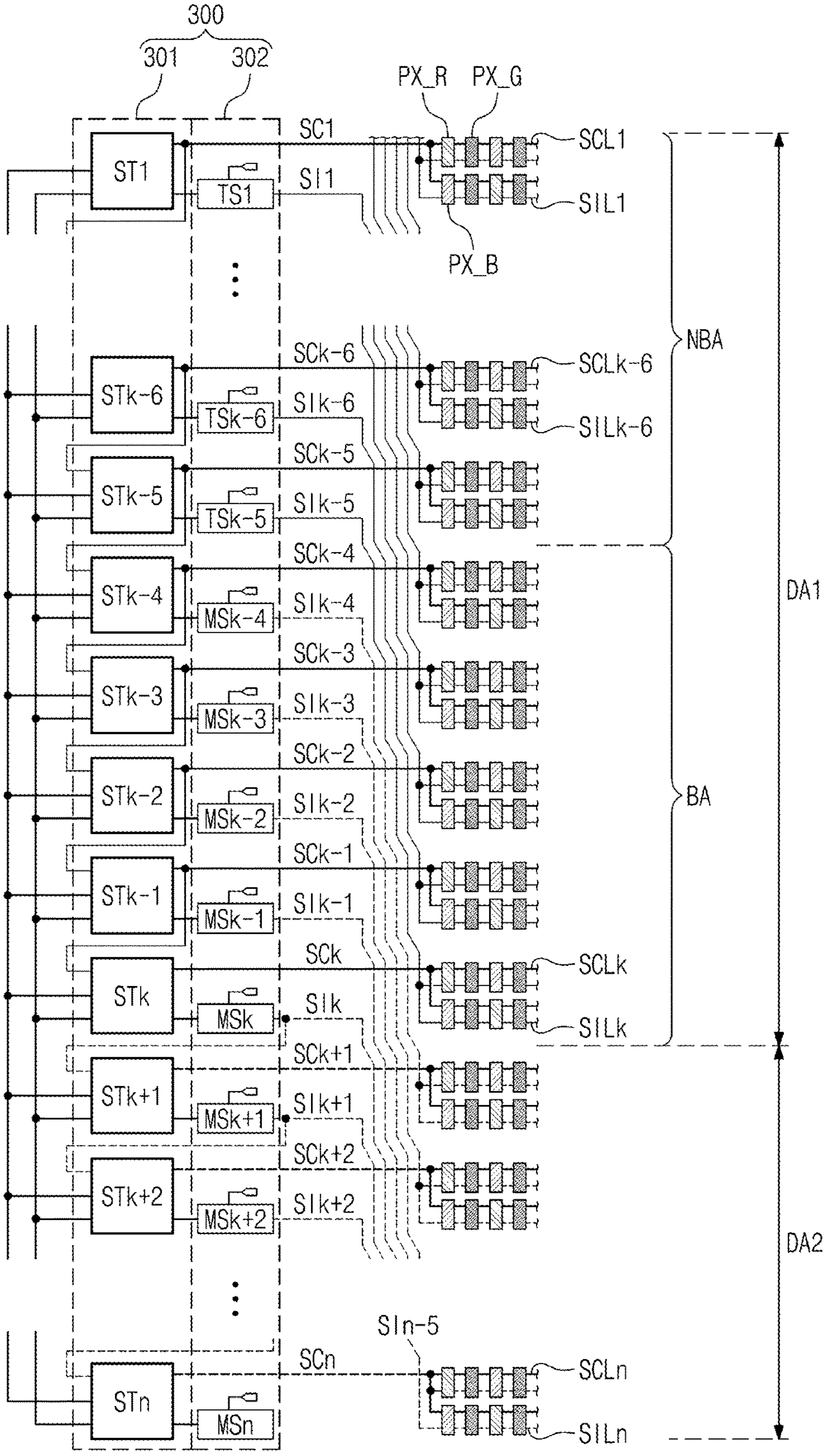
FIG. 7 is a block diagram of a scan driver, according to an embodiment of the disclosure.
Figure 8A:
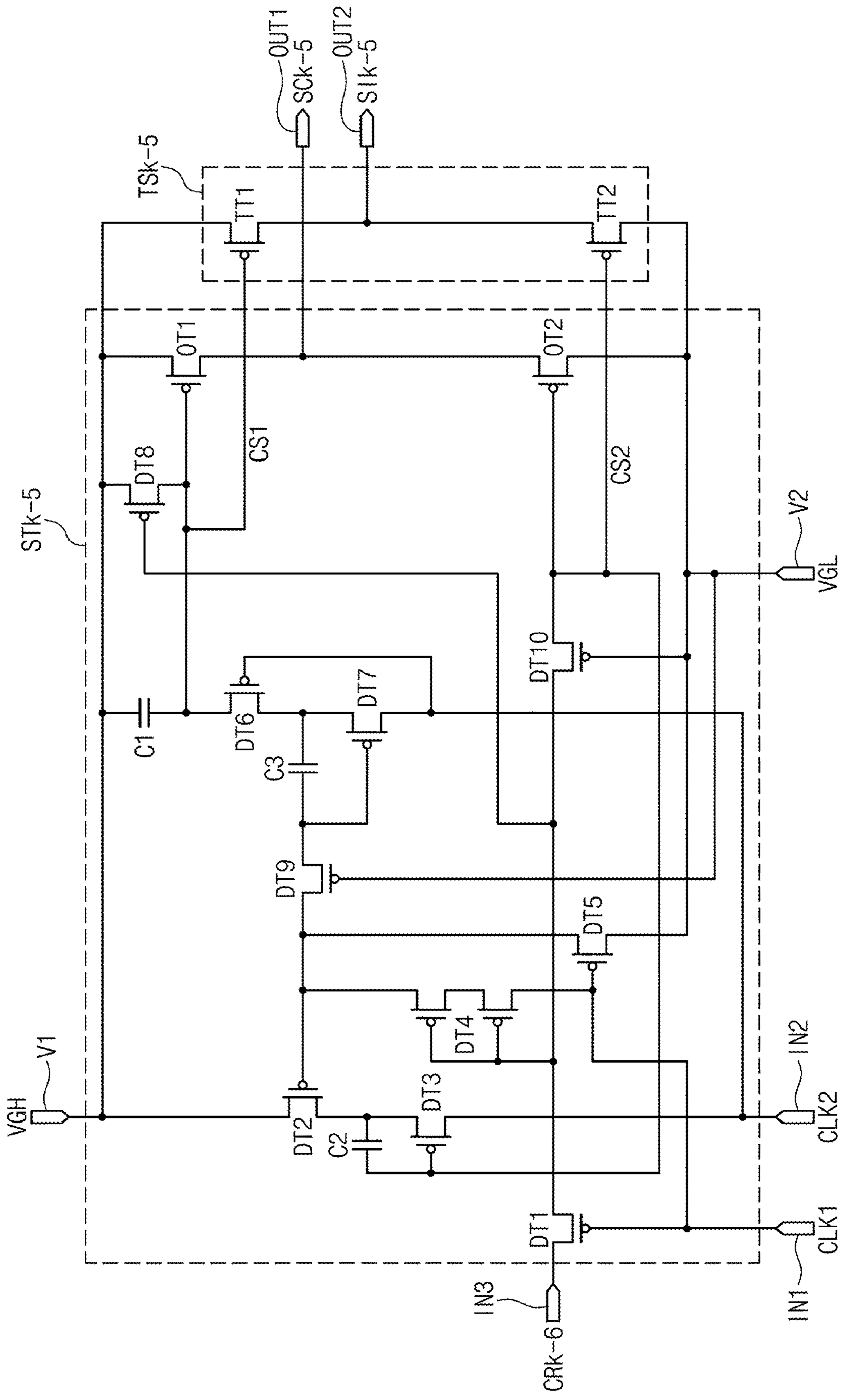
FIG. 8A is a circuit diagram illustrating a (k−5)-th stage and a (k−5)-th transmission circuit shown in FIG. 7.
Figure 8B:
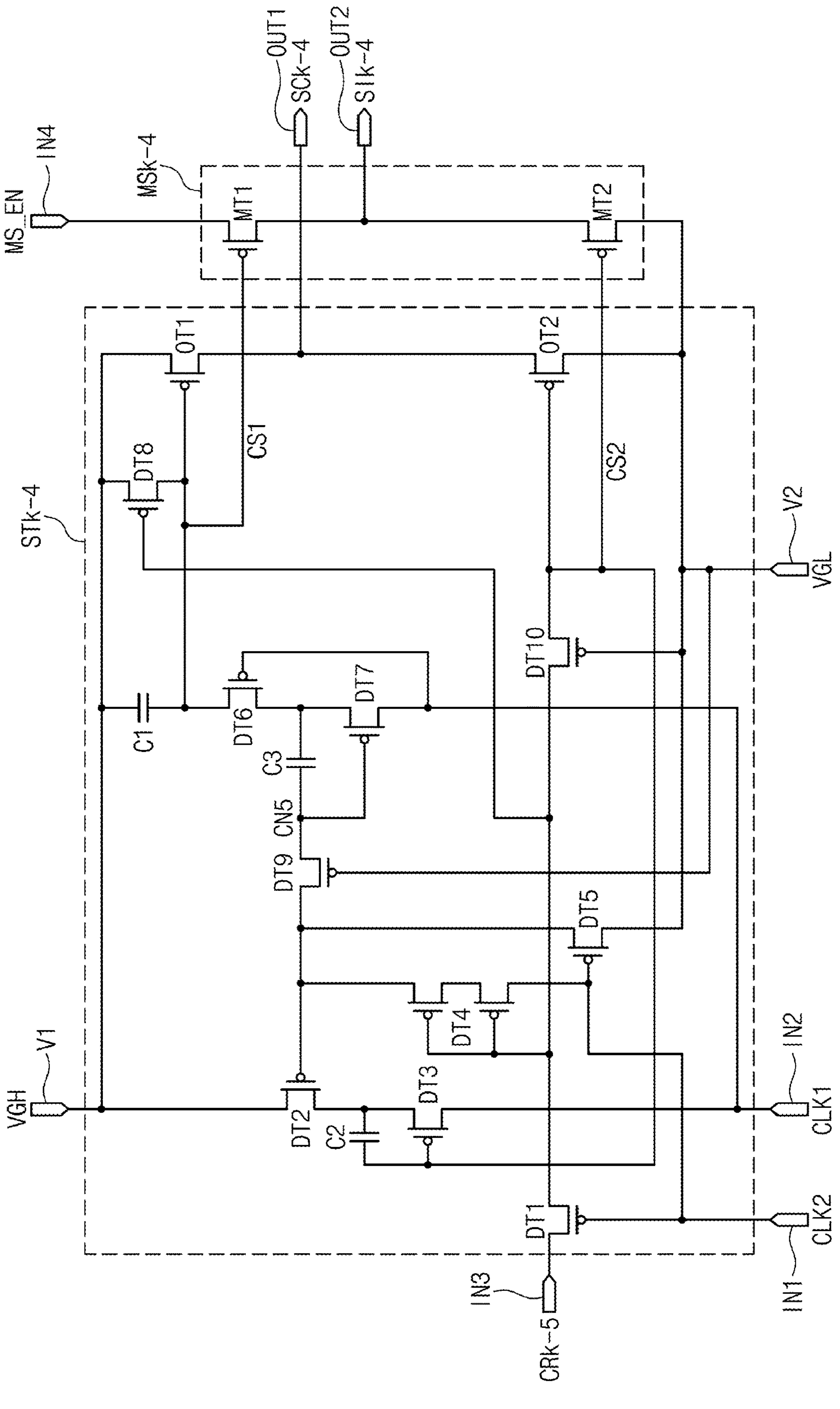
FIG. 8B is a circuit diagram illustrating a (k−4)-th stage and a (k−4)-th masking circuit shown in FIG. 7.
Figure 9A:
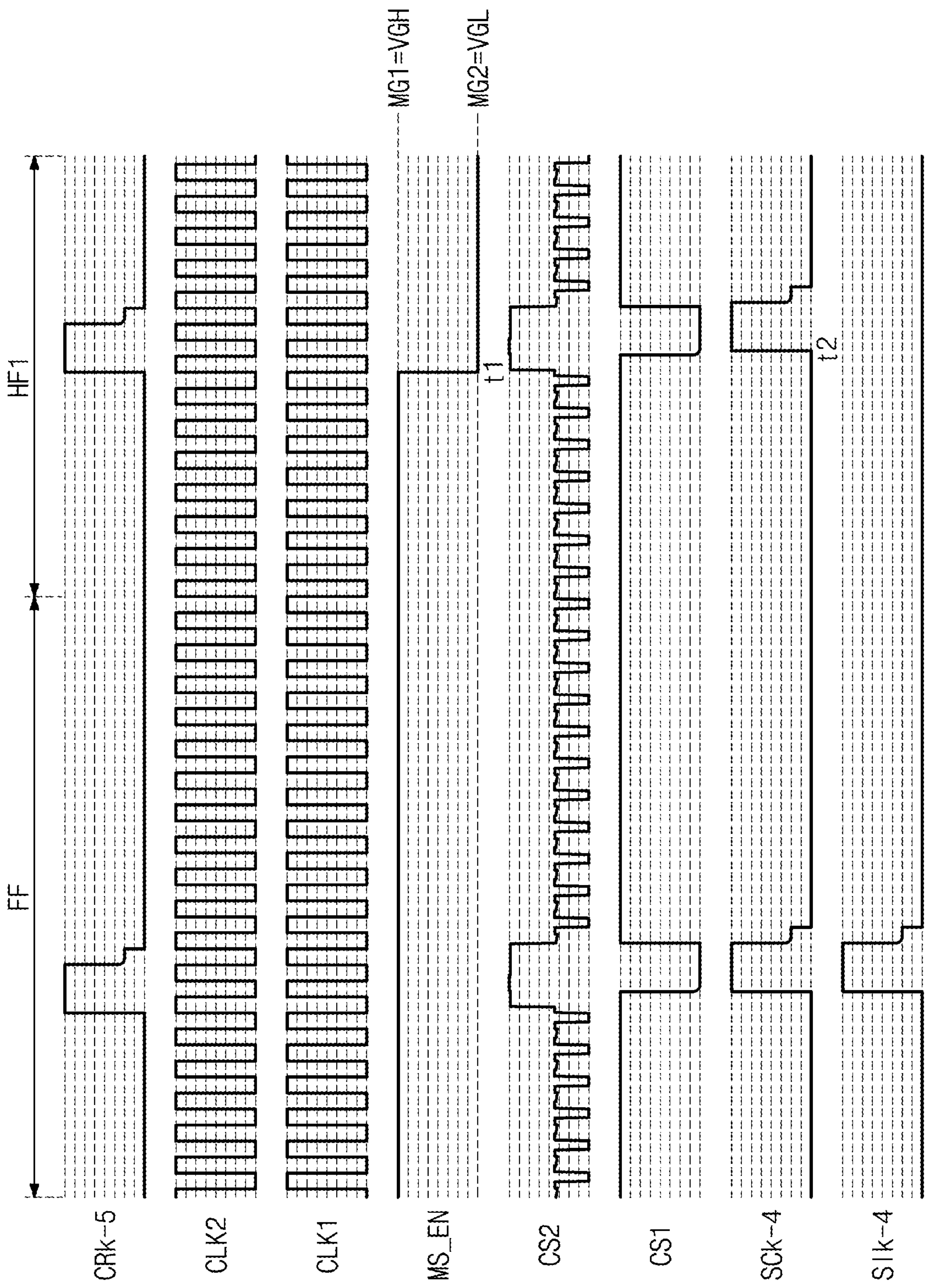
FIG. 9A is a waveform diagram illustrating input signals and output signals of a (k−4)-th masking circuit shown in FIG. 8B.
Figure 9B:
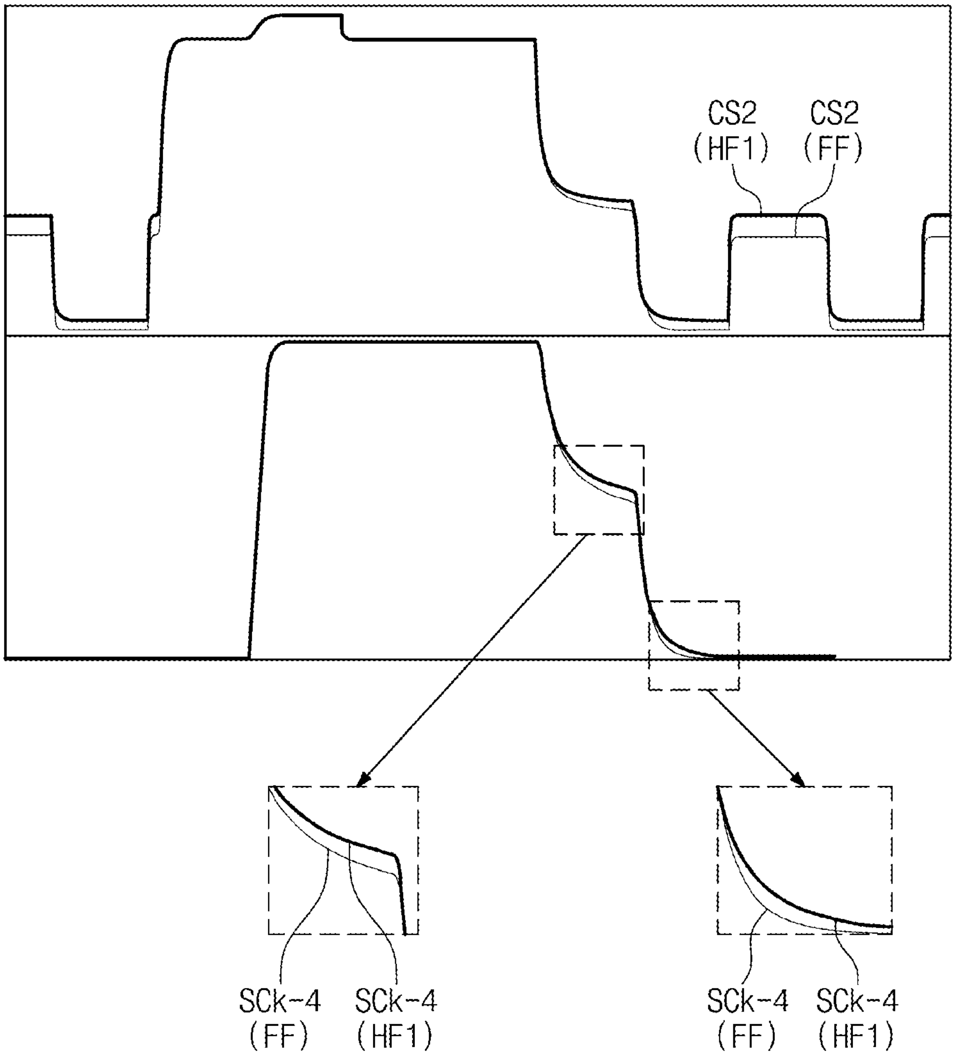
FIG. 9B is an enlarged waveform diagram illustrating a second control signal and a (k−4)-th compensation scan signal shown in FIG. 9A.

FIG. 7 is a block diagram of a scan driver, according to an embodiment of the disclosure. FIG. 8A is a circuit diagram illustrating a (k−5)-th stage and a (k−5)-th transmission circuit shown in FIG. 7. FIG. 8B is a circuit diagram illustrating a (k−4)-th stage and a (k−4)-th masking circuit shown in FIG. 7. FIG. 9A is a waveform diagram illustrating a masking enable signal, a (k−4)-th initialization scan signal, and a (k−4)-th compensation scan signal shown in FIG. 8B. FIG. 9B is an enlarged waveform diagram illustrating a second control signal and a (k−4)-th compensation scan signal shown in FIG. 9A.

Referring to FIGS. 7, 8A, and 8B, an embodiment of the scan driver 300 includes a compensation scan circuit 301 and an initialization scan circuit 302. The compensation scan circuit 301 includes a plurality of stages ST1 to STn that outputs a plurality of compensation scan signals SC1 to SCn, respectively.

Each of the stages ST1 to STn receives the scan control signal SCS from the driving controller 100 illustrated in FIG. 4. The scan control signal SCS may include a start signal, a first clock signal CLK1, and a second clock signal CLK2. Each of the stages ST1 to STn further receives a first voltage VGH and a second voltage VGL. The first voltage VGH and the second voltage VGL may be provided from the voltage generator 400 illustrated in FIG. 4.

The initialization scan circuit 302 may include a plurality of transmission circuits TS1 to TSk−5 and a plurality of masking circuits MSk−4 to MSn. The number of transmission circuits TS1 to TSk−5 and the number of masking circuits MSk−4 to MSn may vary depending on (or be determined based on) the size of the first display area DA1 and the size of the second display area DA2. When the first display area DA1 and the second display area DA2 are determined in the display area DA, the number of transmission circuits TS1 to TSk−5 and the number of masking circuits MSk−4 to MSn may be set depending on sizes of the first display area DA1 and the second display area DA2.

The plurality of transmission circuits TS1 to TSk−5 may be electrically connected to some of a plurality of the stages ST1 to STn, respectively. In an embodiment, for example, the plurality of transmission circuits TS1 to TSk−5 may be respectively connected to the first to (k−5)-th stages ST1 to STk−5 among the plurality of the stages ST1 to STn. The plurality of masking circuits MSk−4 to MSn may be electrically connected to the remaining parts of the plurality of the stages ST1 to STn, respectively. In an embodiment, for example, the plurality of masking circuits MSk−4 to MSn may be electrically connected to the (k−4)-th to n-th stages STk−4 to STn among the plurality of the stages ST1 to STn, respectively.

The plurality of stages ST1 to STn may be connected to each other dependently, e.g., cascadedly. The compensation scan circuit 301 may further include one or more dummy stages arranged to precede the first stages ST1. In an embodiment, for example, the compensation scan circuit 301 may further include five dummy stages, but the number of dummy stages is not limited thereto. The initialization scan circuit 302 may further include one or more dummy transmission circuits arranged to precede the first transmission circuit TS1. In an embodiment, for example, the initialization scan circuit 302 may further include five dummy transmission circuits respectively connected to the five dummy stages, but the number of dummy transmission circuits is not limited thereto.

Although not shown in the drawings, in an embodiment, the first to fifth dummy initialization scan signals output from the first to fifth dummy transmission circuits may be applied to the first to fifth initialization scan lines, respectively. In such an embodiment, the (k−6)-th initialization scan signal SIk−6 output from the (k−6)-th transmission circuit TSk−6 may be applied to the (k−1)-th initialization scan line SILk−1. The (k−5)-th initialization scan signal SIk−5 output from the (k−5)-th transmission circuit TSk−5 may be applied to the k-th initialization scan line SILk. However, the disclosure may not be limited thereto. In an embodiment, a (k−p)-th initialization scan signal may be applied to the k-th initialization scan line SILk. Herein, ‘p’ may be a natural number of 1 or more. In such an embodiment, the compensation scan circuit 301 further includes ‘p’ dummy stages. The initialization scan circuit 302 may further include ‘p’ dummy transmission circuits. In an embodiment, for example, where ‘p’ is 4, the (k−4)-th initialization scan signal SIk−4 output from the (k−4)-th transmission circuit TSk−4 may be applied to the k-th initialization scan line SILk.

Some of the plurality of stages ST1 to STn may receive a compensation scan signal output from the previous stage as a carry signal. The remaining parts of the plurality of stages ST1 to STn may receive one of the initialization scan signals output from the initialization scan circuit 302 as a carry signal. In an embodiment, for example, each of the first to k-th stages ST1 to STk may receive a compensation scan signal output from the previous stage as a carry signal. In an embodiment, each of the (k+1)-th to n-th stages STk+1 to STn may receive one of the initialization scan signals output from the initialization scan circuit 302 as a carry signal. The (k+1)-th stage (STk+1) may receive the k-th initialization scan signal SIk output from the k-th masking circuit MSk among the plurality of masking circuits MSk−4 to MSn as a carry signal. The (k+2)-th stage (STk+2) may receive the (k+1)-th initialization scan signal SIk+1 output from the (k+1)-th masking circuit MSk+1 among the plurality of masking circuits MSk−4 to MSn as a carry signal.

The plurality of pixels PX may be arranged in the display area DA (see FIG. 4). The plurality of pixels PX may include a first pixel PX_R that displays a first color, a second pixel PX_G that displays a second color, and a third pixel PX_B that displays a third color. In an embodiment, for example, the first color may be red, the second color may be green, and the third color may be blue. The first to third colors are not limited thereto, and may be changed or modified variously. In an alternative embodiment, for example, the plurality of pixels PX may further include a fourth pixel that displays a fourth color in addition to the first to third colors.

The plurality of compensation scan lines SCL1 to SCLn and the plurality of initialization scan lines SIL1 to SILn are arranged in the display area DA. In an embodiment, for example, each of the compensation scan lines SCL1 to SCLn may be branched and connected to the pixels PX arranged in a first row and the pixels PX arranged in a second row. In such an embodiment, each of the initialization scan lines SIL1 to SILn may be branched and connected to the pixels PX arranged in the first row and the pixels PX arranged in the second row. FIG. 7 illustrates an embodiment having a structure in which each of the compensation scan lines SCL1 to SCLn is commonly connected to the pixels PX arranged in two rows, but the disclosure is not limited thereto. In an alternative embodiment, for example, each of the compensation scan lines SCL1 to SCLn may be connected to the pixels PX arranged in one row, or may be commonly connected to the pixels PX arranged in four rows. In such an embodiment, each of the initialization scan lines SIL1 to SILn may be connected to the pixels PX arranged in one row, or may be commonly connected to the pixels PX arranged in four rows.

In the multi-frequency mode MFM (see FIG. 2B), the display area DA is divided into the first display area DA1 and the second display area DA2. During the full frame FF (see FIG. 3B), the plurality of stages ST1 to STn may apply the first to n-th compensation scan signals SC1 to SCn, which are sequentially activated, to the first to n-th the compensation scan lines SCL1 to SCLn arranged in the display area DA, respectively. During each of the partial frames HF1 to HF99 (see FIG. 3B), the first to k-th stages ST1 to STk may apply the first to k-th compensation scan signals SC1 to SCk, which are sequentially activated, to the first to k-th compensation scan lines SCL1 to SCLk arranged in the first display area DA1. During each of the partial frames HF1 to HF99, the (k+1)-th to n-th stages STk+1 to STn may apply the deactivated (k+1)-th to n-th compensation scan signals SCk+1 to SCn to the (k+1)-th to n-th compensation scan lines SCLk+1 to SCLn arranged in the second display area DA2, respectively. During each of the partial frames HF1 to HF99, the (k+1)-th to n-th stages STk+1 to STn may hold the (k+1)-th to n-th compensation scan signals SCk+1 to SCn in an inactive state.

During the full frame FF, the first to (k−5)-th transmission circuits TS1 to TSk−5 may apply the first to (k−5)-th initialization scan signals SI1 to SIk−5, which are sequentially activated, to the pixels PX arranged in the first display area DA1. During each of the partial frames HF1 to HF99, the first to (k−5)-th transmission circuits TS1 to TSk−5 may apply the first to (k−5)-th initialization scan signals SI1 to SIk−5, which are sequentially activated, to the pixels PX arranged in the first display area DA1.

During the full frame FF, the (k−4)-th to n-th masking circuits MSk−4 to MSn may apply the (k−4)-th to (n−5)-th initialization scan signals SIk−4 to Sin−5, which are sequentially activated, to the pixels PX arranged in the second display area DA2. During each of the partial frames HF1 to HF99, the (k−4)-th to n-th masking circuits MSk−4 to MSn may apply the deactivated (k−4)-th to (n−5)-th initialization scan signals SIk−4 to SIn−5 in the pixels PX arranged in the second display area DA2. During each of the partial frames HF1 to HF99, the (k−4)-th to n-th masking circuits MSk−4 to MSn may mask the (k−4)-th to (n−5)-th initialization scan signals SIk−4 to SIn−5 not to be activated.

Accordingly, the third and fourth transistors T3 and T4 of each of the pixels PX arranged in the second display area DA2 may be turned on during the full frame FF. However, during each of the partial frames HF1 to HF99, the third and fourth transistors T3 and T4 may not be turned on.

Although not shown in the drawing, the scan driver 300 may further include a write scan circuit that provides write scan signals to the write scan lines SWL1 to SWLn (see FIG. 4), respectively.

In FIGS. 7 and 8A, the (k−5)-th stage STk−5 and the (k−5)-th transmission circuit TSk−5 are illustrated. The (k−5)-th transmission circuit TSk−5 may be electrically connected to the (k−5)-th stage STk−5.

In an embodiment, as shown in FIG. 8A, the (k−5)-th stage STk−5 is connected to first to third input terminals IN1, IN2, and IN3, first and second voltage terminals V1 and V2, and a first output terminal OUT1. The first and second clock signals CLK1 and CLK2 may be applied to the first and second input terminals IN1 and IN2, respectively. A carry signal CRk−6 may be input to the third input terminal IN3. The carry signal CRk−6 may be a compensation scan signal SCk−6 of the (k−6)-th stage STk−6. The first voltage VGH is applied to the first voltage terminal V1, and the second voltage VGL is applied to the second voltage terminal V2. Herein, the second voltage VGL may have a lower voltage level than the first voltage VGH. The first output terminal OUT1 may output the (k−5)-th compensation scan signal SCk−5. During the activation section, the (k−5)-th compensation scan signal SCk−5 may have a same voltage level as the first voltage VGH. During the non-activation section, the (k−5)-th compensation scan signal SCk−5 may have a same level as the second voltage VGL.

The (k−5)-th stage STk−5 may include first to tenth driving transistors DT1 to DT10, first to third driving capacitors C1 to C3, and first and second output transistors OT1 and OT2. The (k−5)-th stage STk−5 may generate the first and second control signals CS1 and CS2 in response to the first and second clock signals CLK1 and CLK2 and a carry signal CRk−6. The first and second output transistors OT1 and OT2 may output the (k−5)-th compensation scan signal SCk−5 in response to first and second control signals CS1 and CS2, respectively.

The (k−5)-th stage STk−5 may apply the first and second control signals CS1 and CS2 to the (k−5)-th transmission circuit TSk−5. The (k−5)-th transmission circuit TSk−5 may include first and second transmission transistors TT1 and TT2. The first and second transmission transistors TT1 and TT2 may be connected between the first and second voltage terminals V1 and V2. The (k−5)-th transmission circuit TSk−5 may output the (k−5)-th initialization scan signal SIk−5 through a second output terminal OUT2 connected between the first and second transmission transistors TT1 and TT2. The first and second transmission transistors TT1 and TT2 may activate the (k−5)-th initialization scan signal SIk−5 in response to the first and second control signals CS1 and CS2. During the activation period, the (k−5)-th initialization scan signal SIk−5 may have a same voltage level as the first voltage VGH. During the non-activation period, the (k−5)-th initialization scan signal SIk−5 may have a same level as the second voltage VGL. The (k−5)-th initialization scan signal SIk−5 may have a same phase as the (k−5)-th compensation scan signal SCk−5, and the (k−5)-th initialization scan signal SIk−5 and the (k−5)-th compensation scan signal SCk−5 may be output simultaneously.

Referring to FIGS. 8B and 9A, the (k−4)-th stage STk−4 has a same configuration as the (k−5)-th stage STk−5. However, only the input signals (e.g., a carry signal CRk−5) of the (k−4)-th stage STk−4 may be different from the input signals (e.g., a carry signal CRk−6) of the (k−5)-th stage STk−5. Accordingly, any repetitive detailed description of the (k−4)-th stage STk−4 will be omitted.

In an embodiment, as shown in FIG. 8B, the (k−4)-th stage STk−4 may apply the first and second control signals CS1 and CS2 to the (k−4)-th masking circuit MSk−4. The (k−4)-th stage STk−4 may comprises first and second masking transistors MT1 and MT2. The first and second masking transistors MT1 and MT2 may be connected between a fourth input terminal IN4 and the second voltage terminal V2. A masking enable signal MS_EN may be entered into the fourth input terminal IN4.

The first and second masking transistors MT1 and MT2 may activate a (k−4)-th initialization scan signal SIk−4 in response to the first and second control signals CST and CS2. During the activation period, the (k−4)-th initialization scan signal SIk−4 may have the same voltage level as the first voltage VGH. During the non-activation period, the (k−4)-th initialization scan signal SIk−4 may have a same level as the second voltage VGL. During the full frame FF, the masking enable signal MS_EN may have a first level MG1. During each partial frame HF1, the masking enable signal MS_EN may have a second level MG2. In an embodiment, for example, the first level MG1 may be the same as the level of the first voltage VGH. The second level MG2 may be the same as the level of the second voltage VGL.

In an embodiment, as shown in FIG. 9A, a time point t1 at which the masking enable signal MS_EN is changed from the first level MGT to the second level MG2 may be positioned between the start time point of the partial frame HF1 and an output time point t2 of the (k−4)-th compensation scan signal SCk−4. In a period where the masking enable signal MS_EN has the first level MGT, the (k−4)-th masking circuit MSk−4 may be substantially the same as the transmission circuits TS1 to TSk−5. However, in a period where the masking enable signal MS_EN has the second level MG2, the masking enable signal MS_EN is applied to the second output terminal OUT2 through the turned-on first masking transistor MT1, and thus the (k−4)-th initialization scan signal SIk−4 is maintained at the second voltage VGL. In such a period, even though the first output transistor OT1 and the first masking transistor MT1 are turned on at the same time in response to the first control signal CS1, the (k−4)-th compensation scan signal SCk−4 is activated. In a period where the masking enable signal MS_EN has the second level MG2, the (k−4)-th initialization scan signal SIk−4 maintains an inactive state by the masking enable signal MS_EN having the second level MG2. Accordingly, during each partial frame HF1, the (k−4)-th masking circuit MSk−4 may mask the activation section of the (k−4)-th initialization scan signal SIk−4.

For convenience of description, FIG. 9B illustrates that a waveform of the second control signal CS2 output in the full frame FF and a waveform of the second control signal CS2 output in the partial frame HF1 are superimposed. Herein, the waveform of the second control signal CS2 output in the full frame FF is referred to as a first waveform CS2(FF). The waveform of the second control signal CS2 output the partial frame HF1 is referred to as a second waveform CS2(HF1).

FIG. 9B illustrates that a waveform of the (k−4)-th compensation scan signal SCk−4 output in the full frame FF and a waveform of the (k−4)-th compensation scan signal SCk−4 output in the partial frame HF1 are superimposed. For convenience of description, the waveform of the (k−4)-th compensation scan signal SCk−4 output in the full frame FF is referred to as a third waveform SCk−4(FF). The waveform of the (k−4)-th compensation scan signal SCk−4 output in the partial frame HF1 is referred to as a fourth waveform SCk−4(HF1).

A deviation may occur between the first waveform CS2 (FF) and the second waveform CS2(HF1) depending on a state of the masking enable signal MS_EN. The voltage level of the second control signal CS2 at a point in time when the masking enable signal MS_EN is at the first level MG1 may be lower than the voltage level of the second control signal CS2 at a point in time when the masking enable signal MS_EN is at the second level MG2. Accordingly, a deviation occurs between the waveform SCk−4(FF) of the (k−4)-th compensation scan signal SCk−4 output in the full frame FF and the waveform SCk−4(HF1) of the (k−4)-th compensation scan signal SCk−4 output in the partial frame HF1. In an embodiment, for example, when the voltage level of the (k−4)-th compensation scan signal SCk−4 increases in the partial frame HF1, the compensation properties of the pixel PX positioned in the boundary area BA and the pixel PX positioned in the non-boundary area NBA may be changed such that a luminance deviation may occur between the boundary area BA and the non-boundary area NBA. In an embodiment, for example, dark lines may be visually perceived in the boundary area BA due to the luminance deviation.

Figure 10:
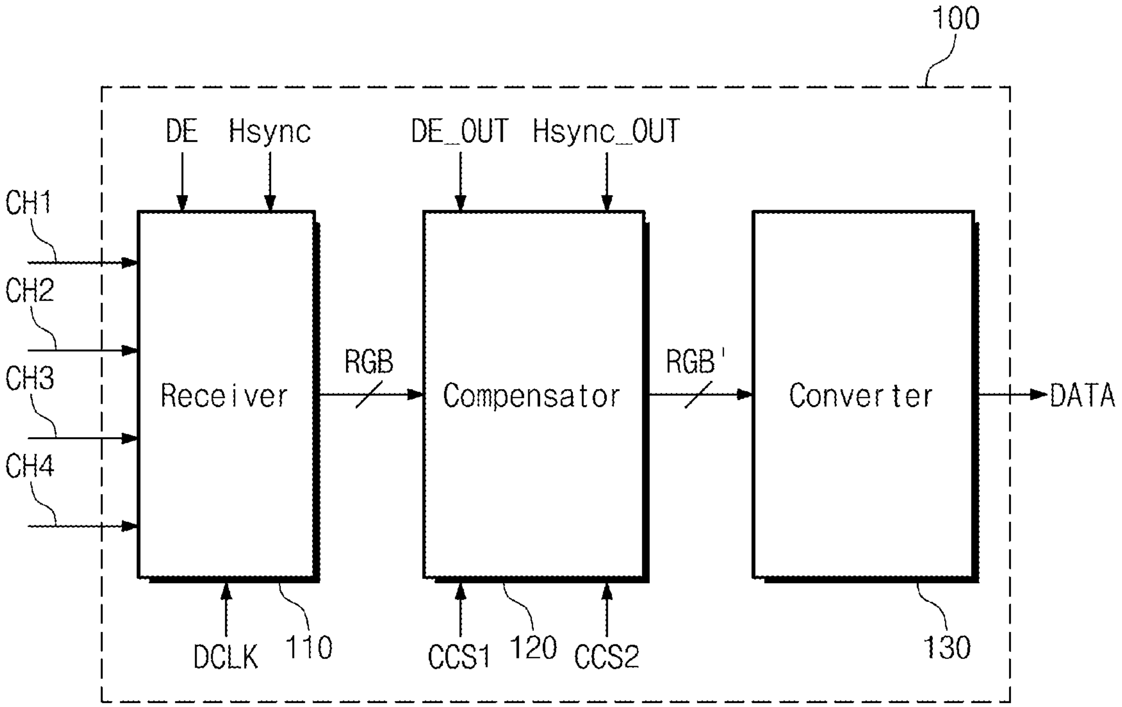
FIG. 10 is a block diagram of a driving controller, according to an embodiment of the disclosure.
Figure 11A:
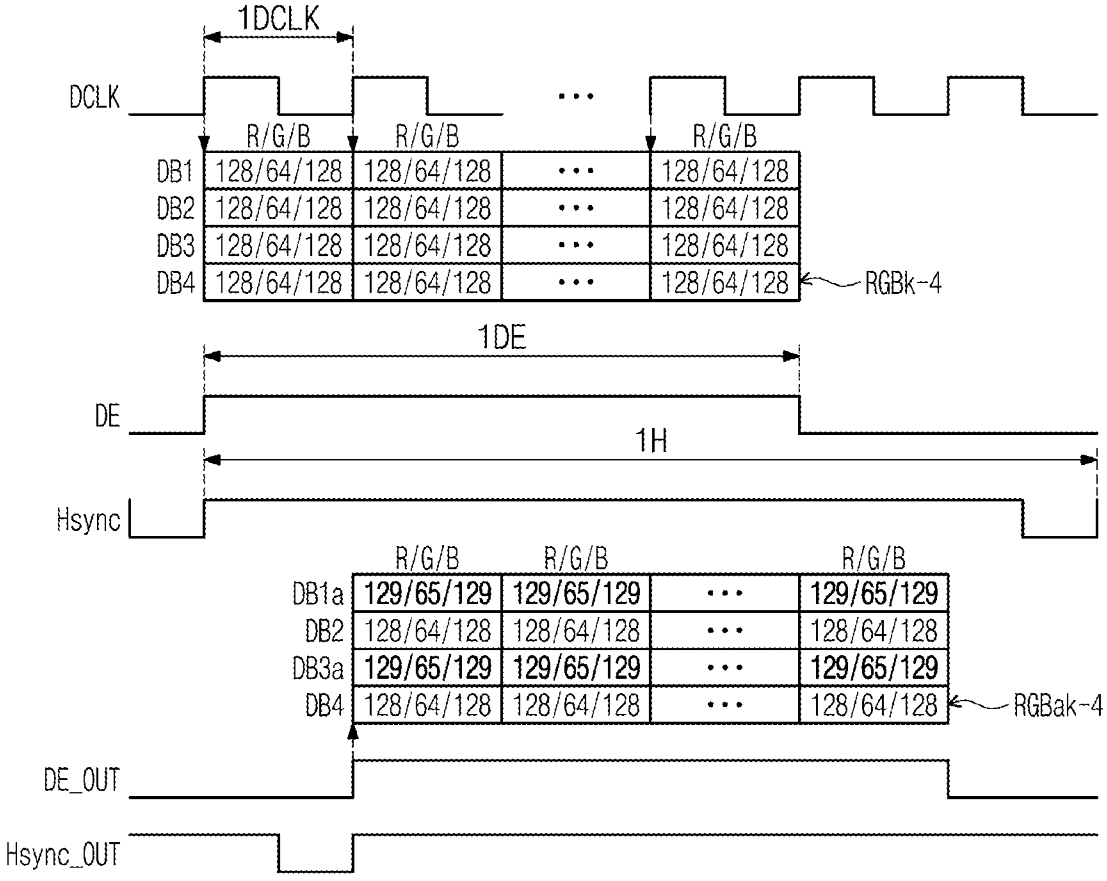
FIG. 11A is a waveform diagram illustrating a compensation process of a compensator shown in FIG. 10.
Figure 11B:
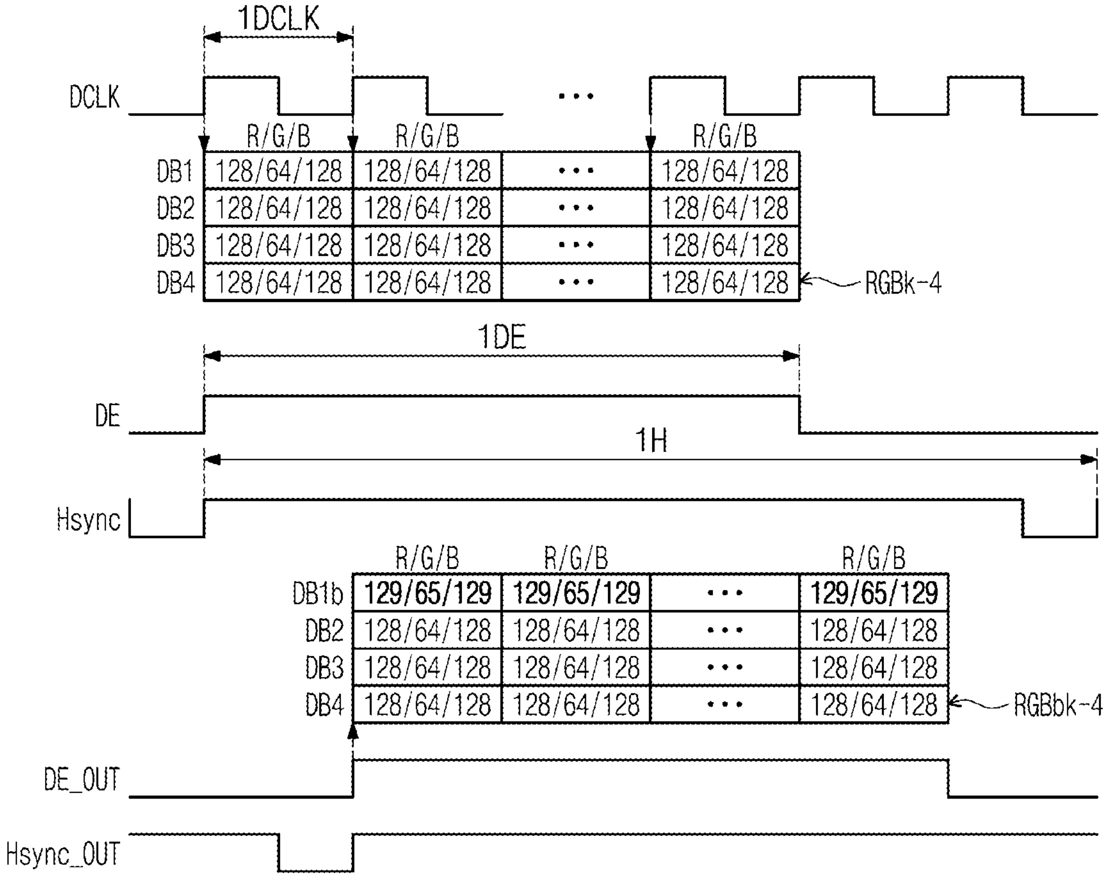
FIG. 11B is a waveform diagram illustrating a compensation process of a compensator, according to an embodiment of the disclosure.

FIG. 10 is a block diagram of a driving controller, according to an embodiment of the disclosure. FIG. 11A is a waveform diagram illustrating a compensation process of a compensator shown in FIG. 10. FIG. 11B is a waveform diagram illustrating a compensation process of a compensator, according to an embodiment of the disclosure.

Referring to FIGS. 4, 10, and 11A, an embodiment of the driving controller 100 may include a receiver 110, a compensator 120, and a converter 130.

The receiver 110 may receive the control signal CTRL and the input image signal RGB from the outside. In an embodiment, for example, the control signal CTRL may include a data enable signal DE, a data clock signal DCLK, and a horizontal synchronization signal Hsync. The receiver 110 may receive the input image signal RGB in synchronization with the data clock signal DCLK. The receiver 110 may receive the input image signal RGB through ‘q’ channels CH1 to CH4. Herein, ‘q’ may be a natural number of 1 or more. The number of channels CH1 to CH4 is not particularly limited thereto and may vary depending on an interface used in the receiver 110.

The receiver 110 may deliver the received input image signal RGB to the compensator 120. In an embodiment, the compensator 120 may compensate for a boundary image signal, which corresponds to the boundary area BA, from among the input image signal RGB, to improve a luminance deviation occurring between the boundary area BA (see FIG. 7) and the non-boundary area NBA (see FIG. 7) in the multi-frequency mode MFM (see FIG. 2A).

The compensator 120 may receive a first compensation control signal CCS1 and a second compensation control signal CCS2. The compensator 120 may determine an input time point and an end time point of the boundary image signal corresponding to the boundary area BA through the first compensation control signal CCS1. In an embodiment, for example, at a high section start time point of the first compensation control signal CCS1, the compensator 120 may initiate a compensation operation. At a low section start time point of the first compensation control signal CCS1, the compensator 120 may end a compensation operation. The compensator 120 may determine the compensation resolution of the boundary image signal through the second compensation control signal CCS2. The compensation resolution will be described in detail with reference to FIGS. 11A and 11B.

The compensator 120 may generate boundary compensation data by compensating the boundary image signal and then may transmit the compensation image signal RGB' including boundary compensation data to the converter 130. The converter 130 may convert the compensation image signal RGB' into the image data signal DATA.

Referring to FIGS. 10 and 11A, the receiver 110 may receive the input image signal RGB through the first to fourth channels CH1 to CH4 in units of one cycle 1DCLK of the data clock signal DCLK. FIG. 11A illustrates a (k−4)-th boundary image signal RGBk−4 corresponding to the pixels PX that receives a (k−4)-th compensation scan signal SCk−4 (see FIG. 7) among the pixels PXs arranged in the boundary area BA. During the activation section 1DE of the data enable signal DE, the (k−4)-th boundary image signal RGBk−4 may be received through the first to fourth channels CH1 to CH4. After one period (or cycle) 1H of the horizontal synchronization signal Hsync has elapsed, the receiver 110 may receive the next boundary image signal (e.g., a (k−3)-th boundary image signal). The (k−3)-th boundary image signal may be an image signal corresponding to the pixels PX that receives the (k−3)-th compensation scan signal SCk−3 (see FIG. 7) among the pixels PXs arranged in the boundary area BA.

The (k−4)-th boundary image signal RGBk−4 may include a data block received through the first to fourth channels CH1 to CH4 in units of the one cycle 1DCLK of the data clock signal DCLK. A data block received through the first channel CH1 is referred to as a first data block DB1. A data block received through the second channel CH2 is referred to as a second data block DB2. A data block received through the third channel CH3 is referred to as a third data block DB3. A data block received through the fourth channel CH4 is referred to as a fourth data block DB4.

The compensator 120 may compensate for only an image signal included in some data blocks among the first to fourth data blocks DB1 to DB4. In an embodiment, for example, when the compensation resolution is 2/4, the compensator 120 may compensate for only two data blocks among the first to fourth data blocks DB1 to DB4. FIG. 11A illustrates an embodiment where the first and third data blocks DB1 and DB3 are compensated, but the disclosure is not limited thereto. Alternatively, the second and third data blocks DB2 and DB3 may be compensated, or the first and fourth data blocks DB1 and DB4 may be compensated.

The compensator 120 may generate the (k−4)-th boundary compensation data RGBak−4 by compensating the (k−4)-th boundary image signal RGBk−4. When the first and third data blocks DB1 and DB3 are compensated, the (k−4)-th boundary compensation data RGBak−4 may include first and third compensation data blocks DB1*a* and DB3*a* and the second and fourth data blocks DB2 and DB4.

The compensator 120 may generate the (k−4)-th boundary compensation data RGBak−4 by reflecting a preset compensation value (i.e., a fixed compensation value) to the (k−4)-th boundary image signal RGBk−4. In an embodiment, for example, the fixed compensation value may be set to a grayscale value of 1. In an embodiment, for example, red image data of the first data block DB1 may have a grayscale value of 128; green image data of the first data block DB1 may have a grayscale value of 64; and blue image data of the first data block DB1 may have a grayscale value of 128. In such an embodiment, when the compensation value of a grayscale of 1 is reflected to the first data block DB1, the first compensation data block DB1*a* may include red compensation data having a grayscale value of 129, green compensation data having a grayscale value of 65, and blue compensation data having a grayscale value of 129. Hereinafter, a mode in which the compensator 120 compensates for the boundary image signal by using a fixed compensation value may be referred to as a "first compensation mode".

In the first compensation mode, the fixed compensation value and the size of compensation resolution are not particularly limited thereto. In an embodiment, for example, the fixed compensation value and the compensation resolution may be determined depending on a luminance deviation between the boundary area BA and the non-boundary area NBA. In an embodiment, for example, when the luminance deviation is small, the fixed compensation value may be small, and the compensation resolution may also be lowered.

Referring to FIG. 11B, when the compensation resolution is 1/4, the compensator 120 may compensate for only two data blocks among the first to fourth data blocks DB1 to DB4. FIG. 11B illustrates an embodiment where the first data block DB1 is compensated, but the disclosure is not limited thereto.

The compensator 120 may generate the (k−4)-th boundary compensation data RGBbk−4 by compensating the (k−4)-th boundary image signal RGBk−4. When the first data block DB1 is compensated, the (k−4)-th boundary compensation data RGBbk−4 may include a first compensation data block DB1*b* and the second to fourth data blocks DB2, DB3, and DB4.

The compensator 120 may generate the (k−4)-th boundary compensation data RGBbk−4 by reflecting a preset fixed compensation value to the (k−4)-th boundary image signal RGBk−4. In an embodiment, for example, the fixed compensation value may be set to a grayscale value of 1. In an embodiment, for example, when the compensation value of a grayscale of 1 is reflected to the first data block DB1, the first compensation data block DB1*a* may include red compensation data having a grayscale value of 129, green compensation data having a grayscale value of 65, and blue compensation data having a grayscale value of 129.

Referring to FIGS. 11A and 11B, the compensator 120 may output the (k−4)-th boundary compensation data (RGBak−4 or RGBbk−4) in synchronization with an output enable signal DE_OUT and an output synchronization signal Hsync_OUT. The output enable signal DE_OUT and the output synchronization signal Hsync_OUT may be signals obtained by delaying the data enable signal DE by one cycle 1DCLK of the data clock signal DCLK. The output synchronization signal Hsync_OUT may be a signal obtained by delaying the horizontal synchronization signal Hsync by one cycle 1DCLK of the data clock signal DCLK.

In such an embodiment, a phenomenon in which dark lines are visually perceived at the boundary area BA due to a luminance deviation occurring between the boundary area BA and the non-boundary area NBA may be effectively prevented or improved by compensating for a boundary image signal corresponding to the boundary area BA through the compensator 120. Accordingly, the overall display quality of the display device DD may be improved in the multi-frequency mode MFM.

Figure 12A:
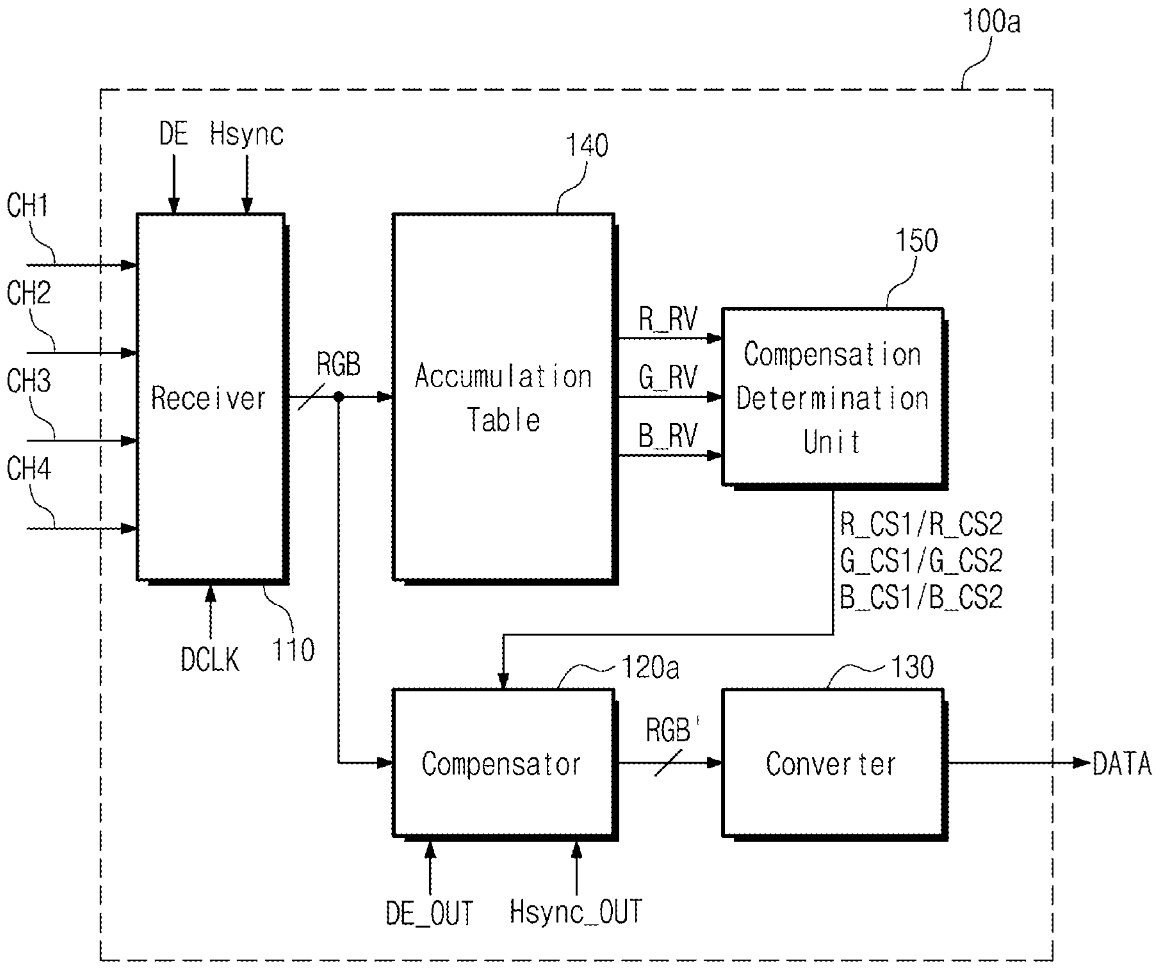
FIG. 12A is a block diagram of a driving controller, according to an embodiment of the disclosure.
Figure 13A:
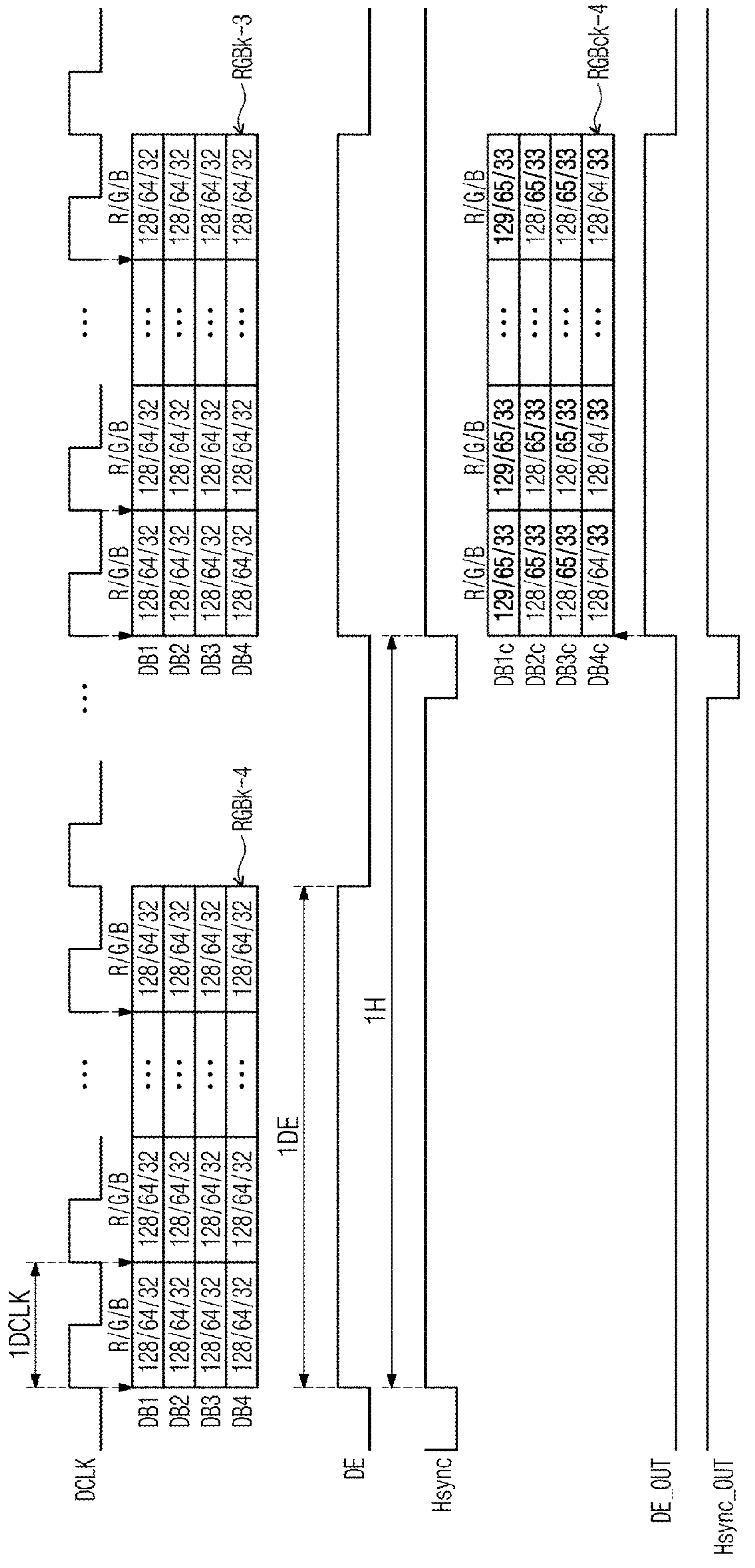
FIG. 13A is a waveform diagram illustrating a compensation process of a compensator shown in FIG. 12A.
Figure 13B:
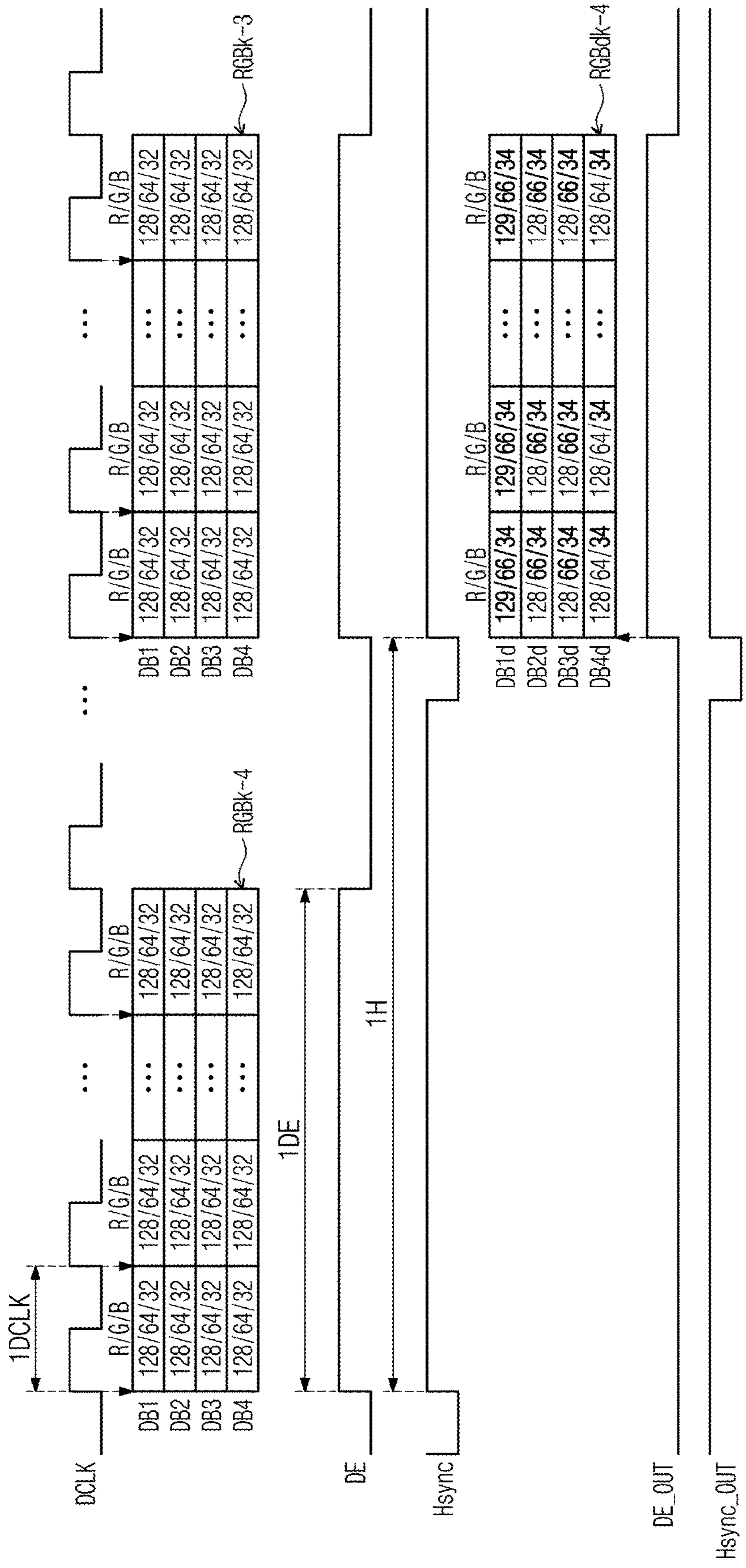
FIG. 13B is a waveform diagram illustrating a compensation process of a compensator, according to an embodiment of the disclosure.

FIG. 12A is a block diagram of a driving controller, according to an embodiment of the disclosure. FIG. 12B is a block diagram illustrating a configuration of an accumulation table shown in FIG. 12A. FIG. 13A is a waveform diagram illustrating a compensation process of a compensator shown in FIG. 12A. FIG. 13B is a waveform diagram illustrating a compensation process of a compensator, according to an embodiment of the disclosure.

Referring to FIGS. 12A and 12B, an embodiment of a driving controller 100*a* may include the receiver 110, an accumulation table 140, a compensation determination unit 150, a compensator 120*a*, and the converter 130.

The receiver 110 may receive the input image signal RGB in synchronization with the data clock signal DCLK. The receiver 110 may receive the input image signal RGB through 'q' channels CH1 to CH4. The receiver 110 may transmit the received input image signal RGB to the compensator 120*a* and the accumulation table 140. The accumulation table 140 may count the input image signal RGB based on a preset reference grayscale range, and may accumulate and store the counted result.

In an embodiment, for example, the accumulation table 140 may include a first accumulation table R_AT, a second accumulation table G_AT, and a third accumulation table B_AT. The first accumulation table R_AT may count a red image signal (or a first boundary image signal) based on a preset reference grayscale range, and may accumulate and store the counted result. In an embodiment, for example, the first accumulation table R_AT may count the red image signal based on five reference grayscale ranges GR1 to GR5. In an embodiment, for example, the first reference grayscale range GR1 may be a grayscale range greater than a grayscale of 128. The second reference grayscale range GR2 may be a grayscale range less than or equal to a grayscale of 128 and may be greater than a grayscale of 96. The third reference grayscale range GR3 may be a grayscale range less than or equal to a grayscale of 96 and may be greater than a grayscale of 64. The fourth reference grayscale range GR4 may be a grayscale range less than or equal to a grayscale of 64 and may be greater than a grayscale of 32. The fifth reference grayscale range GR5 may be a grayscale range less than or equal to a grayscale of 32. However, this is only an example, and the number of reference grayscale ranges GR1 to GR5 is not limited thereto. In an embodiment, for example, the reference grayscale value of each of the reference grayscale range GR1 to GR5 may also be changed.

The second accumulation table GAT may count a green image signal (or a second boundary image signal) based on a preset reference grayscale range, and may accumulate and store the counted result. The third accumulation table B_AT may count a blue image signal (or a third boundary image signal) based on a preset reference grayscale range, and may accumulate and store the counted result. The reference grayscale range set for each of the second accumulation table G_AT and the third accumulation table B_AT may be the same as that of the first accumulation table R_AT.

The accumulation table 140 may transmit the accumulated result value to the compensation determination unit 150. The accumulated result value may include a first result value R_RV for the red image signal, a second result value G_RV for the green image signal, and a third result value B_RV for the blue image signal. The compensation determination unit 150 may determine a compensation value and compensation resolution for each of the red, green, and blue image signals based on the first to third result values R_RV, G_RV, and B_RV.

The compensation value and compensation resolution may be set based on the reference grayscale ranges GR1 to GR5. In an embodiment, for example, when the first to third result values R_RV, G_RV, and B_RV are included in the first reference grayscale range GR1, the compensation value may be a grayscale of 0, and the compensation resolution may be 0/4. When the first to third result values R_RV, G_RV, and B_RV are included in the second reference grayscale range GR2, the compensation value may be a grayscale of 1, and the compensation resolution may be 1/4. When the first to third result values R_RV, G_RV, and B_RV are included in the third reference grayscale range GR3, the compensation value may be a grayscale of 1, and the compensation resolution may be 2/4 or 3/4. When the first to third result values R_RV, G_RV, and B_RV are included in the fourth reference grayscale range GR4, the compensation value may be a grayscale of 1 or 2, and the compensation resolution may be 3/4. When the first to third result values R_RV, G_RV, and B_RV are included in the fifth reference grayscale range GR5, the compensation value may be a grayscale of 1 or 2, and the compensation resolution may be 4/4.

For convenience of description, a compensation value for the red image signal may be referred to as a first compensation value R_CS1. The compensation resolution for the red image signal may be referred to as first compensation resolution R_CS2. In an embodiment, for example, the first result value R_RV is included in the second reference grayscale range GR2. In such an embodiment, the first compensation value R_CS1 may be a grayscale value of 1, and the first compensation resolution R_CS2 may be 1/4.

A compensation value for the green image signal may be referred to as a second compensation value G_CS1. The compensation resolution for the green image signal may be referred to as second compensation resolution G_CS2. In an embodiment, for example, the second result value G_RV is included in the fourth reference grayscale range GR4. In such an embodiment, the second compensation value G_CS1 may be a grayscale value of 1, and the second compensation resolution G_CS2 may be 3/4.

A compensation value for the blue image signal may be referred to as a third compensation value B_CS1. The compensation resolution for the blue image signal may be referred to as third compensation resolution B_CS2. In an embodiment, for example, the third result value B_RV is included in the fifth reference grayscale range GR5. In such an embodiment, the third compensation value B_CS1 may be a grayscale value of 1, and the third compensation resolution B_CS2 may be 4/4.

Referring to FIGS. 12A and 13A, during the activation section 1DE of the data enable signal DE, the (k−4)-th boundary image signal RGBk−4 may be received through the first to fourth channels CH1 to CH4. After one period (or cycle) 1H of the horizontal synchronization signal Hsync has elapsed, the receiver 110 may receive the next boundary image signal (e.g., a (k−3)-th boundary image signal RGBk−3). The (k−3)-th boundary image signal RGBk−3 may be an image signal corresponding to the pixels PX that receives the (k−3)-th compensation scan signal SCk−3 (see FIG. 7) among the pixels PXs arranged in the boundary area BA.

The compensator 120*a* may compensate for only the red image signal (R) for one data block among the first to fourth data blocks DB1 to DB4. The red image signal (R) having a grayscale of 128, which is included in the first data block DB1 may be compensated to red compensation data having a grayscale of 129.

The compensator 120*a* may compensate for the green image signal (G) for three data blocks among the first to fourth data blocks DB1 to DB4. The green image signal (G) having a grayscale of 64, which is included in the first to third data blocks DB1 to DB3 may be compensated to the green compensation data having a grayscale of 65.

The compensator 120*a* may compensate for the blue image signal (B) for four data blocks among the first to fourth data blocks DB1 to DB4. The blue image signal (B) having a grayscale of 32, which is included in the first to fourth data blocks DB1 to DB4, may be compensated to the blue compensation data having a grayscale of 33.

In such an embodiment, the compensator 120*a* may generate a (k−4)-th boundary compensation data RGBck−4 by compensating for the (k−4)-th boundary image signal RGBk−4 based on the reference grayscale range. The (k−4)-th boundary compensation data RGBck−4 may include first to fourth compensation data blocks DB1*c*, DB2*c*, DB3*c*, and DB4*c*.

Referring to FIGS. 12A and 13B, the compensator 120*a* may compensate for only the red image signal (R) for one data block among the first to fourth data blocks DB1 to DB4. The red image signal (R) having a grayscale of 128, which is included in the first data block DB1, may be compensated to red compensation data having a grayscale of 129.

The compensator 120*a* may compensate for the green image signal (G) for three data blocks among the first to fourth data blocks DB1 to DB4. The green image signal (G) having a grayscale of 64, which is included in the first to third data blocks DB1 to DB3, may be compensated to the green compensation data having a grayscale of 66.

The compensator 120*a* may compensate for the blue image signal (B) for four data blocks among the first to fourth data blocks DB1 to DB4. The blue image signal (B) having a grayscale of 32, which is included in the first to fourth data blocks DB1 to DB4, may be compensated to the blue compensation data having a grayscale of 34.

In such an embodiment, the compensator 120*a* may generate a (k−4)-th boundary compensation data RGBdk−4 by compensating for the (k−4)-th boundary image signal RGBk−4 depending on the reference grayscale range. The (k−4)-th boundary compensation data RGBdk−4 may include first to fourth compensation data blocks DB1*d*, DB2*d*, DB3*d*, and DB4*d*.

In such an embodiment, when a boundary image signal is compensated based on the reference grayscale ranges GR1 to GR5 (hereinafter referred to as a "second compensation mode"), the compensation value or compensation resolution at a low grayscale may be increased, and the compensation value or compensation resolution at a high grayscale may be decreased. When the properties of the boundary area BA due to a luminance deviation vary depending on a grayscale, the luminance deviation between the boundary area BA and the non-boundary area NBA may be improved more efficiently by compensating for a boundary image signal in the second compensation mode.

For convenience of description, FIG. 10 illustrates a configuration of the driving controller 100 capable of operating in a first compensation mode. FIG. 12A illustrates a configuration of the driving controller 100*a* capable of operating in a second compensation mode. Alternatively, the driving controllers 100 and 100*a* may have a configuration capable of operating in both first and second compensation modes. Accordingly, in such an embodiment, a user or a designer may set the driving controllers 100 and 100*a* to operate in one of the first and second compensation modes.

Referring to FIGS. 13A and 13B, the compensator 120*a* may output the (k−4)-th boundary compensation data (RGBck−4 or RGBdk−4) in synchronization with the output enable signal DE_OUT and the output synchronization signal Hsync_OUT. Herein, the output enable signal DE_OUT and the output synchronization signal Hsync_OUT may be signals obtained by delaying the data enable signal DE by one period 1H of the horizontal synchronization signal Hsync. The output synchronization signal Hsync_OUT may be a signal obtained by delaying the horizontal synchronization signal Hsync by one period 1H of the horizontal synchronization signal Hsync.

Figure 14:
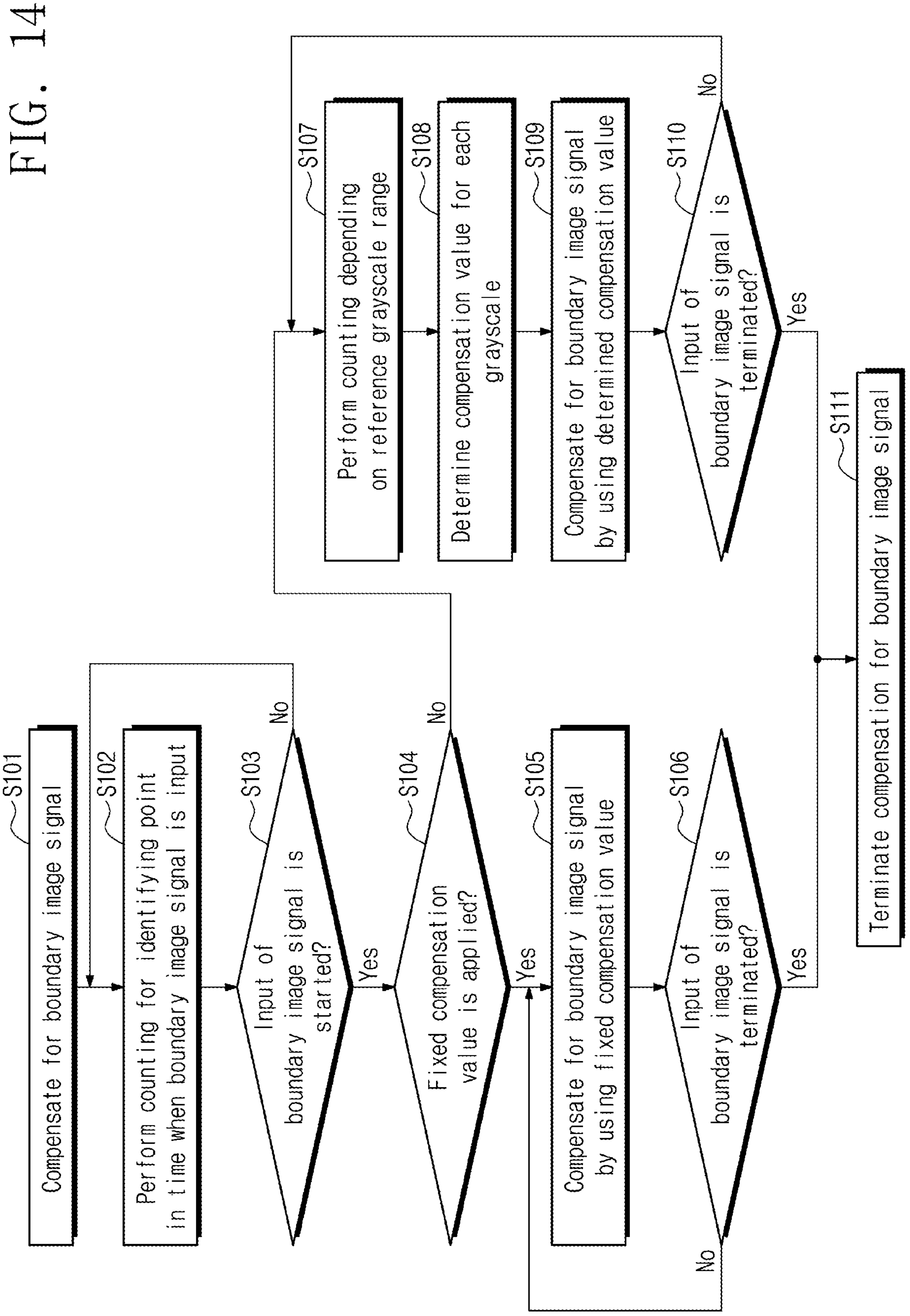
FIG. 14 is a flowchart illustrating a method of driving a display device, according to an embodiment of the disclosure.

FIG. 14 is a flowchart illustrating a method of driving a display device, according to an embodiment of the disclosure.

Referring to FIGS. 4 and 14, in an embodiment, the display device DD may perform a compensation operation on a boundary image signal to improve the image quality of the boundary area BA (see FIG. 7).

When it is desired to compensate for the boundary image signal, the driving controller 100 may start a compensation operation on the boundary image signal (S101). In an embodiment, the compensation operation of the driving controller 100 may be started in the multi-frequency mode MFM (see FIG. 2B). When the compensation operation is started, the driving controller 100 may perform counting to identify a point in time when the boundary image signal corresponding to the boundary area BA is input (S102).

In such an embodiment, it is determined whether the input of the boundary image signal is started (S103) based on the counted result. When it is determined that the input of the boundary image signal is started, the driving controller 100 may determine a compensation mode (S104). In an embodiment, for example, the driving controller 100 may determine whether to operate in a first compensation mode in which the compensation operation is performed by using a fixed compensation value, or may determine whether to operate in a second compensation mode in which a compensation value is changed depending on a grayscale range. When operating in the first compensation mode, the driving controller 100 may compensate for the boundary image signal by using a preset fixed compensation value (S105). The compensation operation in the first compensation mode is described with reference to FIGS. 10 to 11B, and thus any repetitive detailed description thereof will be omitted to avoid redundancy.

Afterward, it is determined whether an input of the boundary image signal is terminated (S106). When the input of the boundary image signal to the boundary area BA is terminated, and an image signal for the second display area DA2 (see FIG. 7) or the non-boundary area NBA (see FIG. 7) is input, the driving controller 100 may terminate the compensation operation (S111). However, when the boundary image signal for the boundary area BA is still being input, the driving controller 100 may repeatedly perform the compensation operation by moving to operation S105.

When the result of determining the compensation mode indicates that the driving controller 100 does not operate in the first compensation mode, the driving controller 100 may enter the second compensation mode in which the compensation value is changed depending on a grayscale range (S107, S108, S109 and S110). The compensation operation in the second compensation mode is described with reference to FIGS. 12A to 13B, and thus any repetitive detailed description thereof will be omitted to avoid redundancy.

However, FIG. 14 illustrates an operating process of selecting one of the first and second compensation modes. However, the disclosure may not be limited thereto. Alternatively, the driving controller 100 may operate in the fixed one of the first and second compensation modes. In an embodiment, where a compensation mode is fixed as the first compensation mode, operation S104, operation S107 to operation S110 may be omitted. In an alternative embodiment, where the compensation mode is fixed as the second compensation mode, operation S104 to operation S106 may be omitted.

According to embodiments of the disclosure, a phenomenon in which dark lines are visually perceived in a boundary area due to a luminance deviation occurring between the boundary area and a non-boundary area may be effectively prevented, by compensating for a boundary image signal corresponding to the boundary area. Accordingly, in such embodiment, the overall display quality of a display device may be improved in a multi-frequency mode.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel including a plurality of pixels, which are connected to a plurality of data lines and a plurality of scan lines, wherein a first display area and a second display area, which operate at different frequencies from each other in a multi-frequency mode, are defined in the display panel;

a data driver which drives the plurality of data lines;

a scan driver which drives the plurality of scan lines; and a driving controller which controls the data driver and the scan driver, wherein wherein the first display area includes a boundary area, which adjacent to the second display area, and a non-boundary area, which is not adjacent to the second display area, the scan driver includes a first scan circuit outputting a plurality of first scan signals and a second scan circuit outputting a plurality of second scan signals, the driving controller generates boundary compensation data by compensating for boundary image signals, which are input to correspond to a boundary area of the first display area in the multi-frequency mode, wherein the boundary area is a portion of the first display area adjacent to the second display area, the driving controller drives the data driver based on a compensation image signal including the boundary compensation data, and the second scan circuit includes:

a plurality of transmission circuits arranged to correspond to the non-boundary area, wherein the plurality of transmission circuits outputs a part of the plurality of second scan signals in the multi-frequency mode; and a plurality of masking circuits arranged to correspond to the boundary area and the second display area, wherein the plurality of masking circuits masks a remaining part of the plurality of second scan signals in the multi-frequency mode.

2. The display device of claim 1, wherein the boundary area is positioned between the non-boundary area and the second display area.

3. The display device of claim 2, wherein the first scan circuit is a compensation scan circuit including a plurality of stages, which outputs a plurality of compensation scan signals, respectively; and the second scan circuit is an initialization scan circuit electrically connected to the compensation scan circuit, wherein the initialization scan circuit outputs a plurality of initialization scan signals.

4. The display device of claim 3, wherein the plurality of transmission circuits outputs a part of the plurality of initialization scan signals in the multi-frequency mode as the part of the plurality of second scan signals; and the plurality of masking circuits masks a remaining part of the plurality of initialization scan signals in the multi-frequency mode as the remaining part of the plurality of second scan signals.

5. The display device of claim 3, wherein a pixel of the plurality of pixels is connected to a k-th compensation scan line and a k-th initialization scan line among the plurality of scan lines, wherein the k-th initialization scan line receives a (k−p)-th initialization scan signal among the plurality of initialization scan signals, and wherein p is a natural number of 1 or greater.

6. The display device of claim 5, wherein the k-th compensation scan line receives a k-th compensation scan signal, and wherein an activation period of the k-th compensation scan signal does not overlap an activation period of the (k−p)-th initialization scan signal.

7. The display device of claim 1, wherein the driving controller includes:

a receiver which receives the boundary image signals through q channels in synchronization with a data clock signal; and a compensator which generates the boundary compensation data by reflecting a preset compensation value to the boundary image signals in units of one cycle of the data clock signal, and wherein q is a natural number of 1 or greater.

8. The display device of claim 7, wherein the compensator receives a first compensation control signal which determines an input time point and an end time point of the boundary image signals corresponding to the boundary area.

9. The display device of claim 7, wherein the boundary image signals include q data blocks respectively entered through the q channels, and wherein the compensator receives a second compensation control signal which determines the number of data blocks to be compensated from among the q data blocks, and reflects the preset compensation value to a data block selected from the q data blocks in response to the second compensation control signal.

10. The display device of claim 7, wherein the receiver receives the boundary image signals in response to a data enable signal and a horizontal synchronization signal, and wherein the compensator outputs the compensation image signal in response to an output enable signal and an output synchronization signal.

11. The display device of claim 10, wherein the output enable signal is a signal obtained by delaying the data enable signal by the one cycle of the data clock signal, and wherein the output synchronization signal is a signal obtained by delaying the horizontal synchronization signal by the one cycle of the data clock signal.

12. The display device of claim 1, wherein the driving controller includes:

a receiver which receives the boundary image signals through q channels in synchronization with a data clock signal;

an accumulation table which accumulates a result of counting the boundary image signals based on preset reference grayscale ranges;

a compensation determination unit which determines a compensation value for each reference grayscale range based on the accumulated result value; and a compensator which generates the boundary compensation data by compensating for the boundary image signals based on the determined compensation value, and wherein q is a natural number of 1 or greater.

13. The display device of claim 12, wherein the accumulation table includes:

a first accumulation table which accumulates a result of counting a first boundary image signal corresponding to a first color based on the reference grayscale ranges;

a second accumulation table which accumulates a result of counting a second boundary image signal corresponding to a second color based on the reference grayscale ranges; and a third accumulation table which accumulates a result of counting a third boundary image signal corresponding to a third color based on the reference grayscale ranges.

14. The display device of claim 13, wherein the compensation determination unit receives a first result value from the first accumulation table and determines a first compensation value based on the first result value, the compensation determination unit receives a second result value from the second accumulation table and determines a second compensation value based on the second result value, and the compensation determination unit receives a third result value from the third accumulation table and determines a third compensation value based on the third result value.

15. The display device of claim 13, wherein each of the first to third boundary image signals includes q data blocks respectively entered through the q channels, wherein the compensation determination unit determines first compensation resolution for determining the number of data blocks to be compensated from among the q data blocks based on the first result value, the compensation determination unit determines second compensation resolution for determining the number of data blocks to be compensated from among the q data blocks based on the second result value, and the compensation determination unit determines third compensation resolution for determining the number of data blocks to be compensated from among the q data blocks based on the third result value.

16. The display device of claim 12, wherein the receiver receives a plurality of input image signals in response to a data enable signal and a horizontal synchronization signal, and wherein the compensator outputs the compensation image signal in response to an output enable signal and an output synchronization signal.

17. The display device of claim 16, wherein the output enable signal is a signal obtained by delaying the data enable signal by one cycle of the horizontal synchronization signal, and wherein the output synchronization signal is a signal obtained by delaying the horizontal synchronization signal by the one cycle of the horizontal synchronization signal.

18. A method of driving a display device including: a first display area and a second display area, which operate at different frequencies in a multi-frequency mode, wherein the first display area includes a boundary area, which adjacent to the second display area, and a non-boundary area, which is not adjacent to the second display area; and a scan driver including a first scan circuit outputting a plurality of first scan signals and a second scan circuit outputting a plurality of second scan signals, the method comprising:

receiving a boundary image signal corresponding to a boundary area of the first display area, wherein the boundary area is a portion of the first display area adjacent to the second display area;

generating boundary compensation data by compensating for the boundary image signal; and driving the first display area and the second display area based on a compensation image signal including the boundary compensation data, wherein the second scan circuit includes:

a plurality of transmission circuits arranged to correspond to the non-boundary area, wherein the plurality of transmission circuits outputs a part of the plurality of second scan signals in the multi-frequency mode; and a plurality of masking circuits arranged to correspond to the boundary area and the second display area, wherein the plurality of masking circuits masks a remaining part of the plurality of second scan signals in the multi-frequency mode.

19. The method of claim 18, wherein the compensating for the boundary image signal includes:

receiving the boundary image signal in synchronization with a data clock signal; and generating the boundary compensation data by reflecting a preset compensation value to the boundary image signal in units of one period of the data clock signal.

20. The method of claim 18, wherein the compensating for the boundary image signal includes:

receiving the boundary image signal in synchronization with a data clock signal;

accumulating a result of counting the boundary image signal based on preset reference grayscale ranges;

determining a compensation value for each reference grayscale range based on the accumulated result value; and generating the boundary compensation data by compensating for the boundary image signal based on the determined compensation value.

* * * * *